(12) United States Patent
Davlantes et al.

(10) Patent No.: US 11,611,242 B2
(45) Date of Patent: Mar. 21, 2023

(54) SYSTEM AND METHOD FOR WIRELESS POWER NETWORKING

(71) Applicant: Reach Power, Inc., Redwood City, CA (US)

(72) Inventors: Christopher Joseph Davlantes, Redwood City, CA (US); Varun Ramaswamy, Redwood City, CA (US)

(73) Assignee: Reach Power, Inc., Redwood City, CA (US)

(*) Notice: Subject to any disclaimer, the term of this patent is extended or adjusted under 35 U.S.C. 154(b) by 0 days.

(21) Appl. No.: 17/720,084

(22) Filed: Apr. 13, 2022

(65) Prior Publication Data
US 2022/0337096 A1    Oct. 20, 2022

Related U.S. Application Data

(60) Provisional application No. 63/319,226, filed on Mar. 11, 2022, provisional application No. 63/174,992, filed on Apr. 14, 2021.

(51) Int. Cl.
*H02J 50/23* (2016.01)
*H02J 50/50* (2016.01)
(Continued)

(52) U.S. Cl.
CPC ............ *H02J 50/23* (2016.02); *H01Q 3/005* (2013.01); *H02J 50/50* (2016.02); *H04B 7/145* (2013.01)

(58) Field of Classification Search
CPC .. H04B 7/00; H04B 7/145; H02J 50/12; H02J 50/23; H02J 50/50; H02J 50/27;
(Continued)

(56) References Cited

U.S. PATENT DOCUMENTS 6,967,462 B1    11/2005  Landis
7,144,922 B2    12/2006  Demssie et al.
(Continued)

FOREIGN PATENT DOCUMENTS

CN    104702105 A    6/2015
EP    3625582 B1    2/2021
(Continued)

OTHER PUBLICATIONS

Wikipedia contributors "Power dividers and directional couplers", Wikipedia, The Free Encyclopedia. Wikipedia, The Free Encyclopedia, Mar. 1, 2020. Web. Jun. 5, 2020. (Year: 2020).
(Continued)

*Primary Examiner* — Blane J Jackson
(74) *Attorney, Agent, or Firm* — Jeffrey Schox; Samuel Rosenthal

(57) ABSTRACT

A system for wireless power networking, preferably including one or more nodes, such as transmit nodes, receive nodes, relay nodes, and/or hybrid nodes. The system may function to form a power network (e.g., mesh network) configured to transfer power wirelessly between nodes of the system. A method for wireless power networking, preferably including transmitting power, controlling relay nodes, and/or receiving power, and optionally including optimizing power network operation. The method is preferably performed at (e.g., by one or more nodes of) the system, but can additionally or alternatively be performed by any other suitable system(s).

19 Claims, 12 Drawing Sheets

(51) Int. Cl.
*H01Q 3/30* (2006.01)
*H01Q 3/00* (2006.01)
*H04B 7/145* (2006.01)

(58) Field of Classification Search
CPC ............ H01Q 3/00; H01Q 3/008; H01Q 3/26; H01Q 3/36; H01Q 50/23; H01Q 50/50
See application file for complete search history.

(56) References Cited

U.S. PATENT DOCUMENTS

| | | |
|---|---|---|
| 7,424,058 B1 | 9/2008 | Staley et al. |
| 7,502,340 B1 | 3/2009 | Chuang et al. |
| 8,134,516 B1 | 3/2012 | Yaghjian et al. |
| 8,159,364 B2 | 4/2012 | Zeine |
| 8,175,660 B2 | 5/2012 | Porwal |
| 8,180,286 B2 | 5/2012 | Yamasuge |
| 8,338,991 B2 | 12/2012 | Von et al. |
| 8,650,418 B2 | 2/2014 | Wu |
| 8,682,318 B2 | 3/2014 | Lee et al. |
| 8,766,544 B2 | 7/2014 | Velazquez |
| 8,772,967 B1 | 7/2014 | Ikriannikov et al. |
| 9,142,990 B2 | 9/2015 | Keeling et al. |
| 9,288,769 B2 | 3/2016 | Tandai et al. |
| 9,306,401 B2 | 4/2016 | Lee et al. |
| 9,368,020 B1 | 6/2016 | Bell et al. |
| 9,425,629 B2 | 8/2016 | Kim et al. |
| 9,544,004 B2 | 1/2017 | Callaway et al. |
| 9,547,099 B2 | 1/2017 | Shih |
| 9,608,454 B2 | 3/2017 | Sankar |
| 9,622,195 B2 | 4/2017 | Ko et al. |
| 9,711,978 B2 | 7/2017 | Manova-Elssibony et al. |
| 9,853,486 B2 | 12/2017 | Liu et al. |
| 9,859,757 B1 | 1/2018 | Leabman et al. |
| 9,876,380 B1 | 1/2018 | Leabman et al. |
| 9,882,427 B2 | 1/2018 | Leabman et al. |
| 9,893,555 B1 | 2/2018 | Leabman et al. |
| 9,967,462 B2 | 5/2018 | Kimura et al. |
| 10,021,523 B2 | 7/2018 | Leabman |
| 10,069,592 B1 | 9/2018 | Krunz et al. |
| 10,135,257 B1 | 11/2018 | Adolf et al. |
| 10,148,320 B2 | 12/2018 | Shin et al. |
| 10,181,729 B1 | 1/2019 | Devaul et al. |
| 10,193,390 B2 | 1/2019 | Riehl |
| 10,199,849 B1 | 2/2019 | Bell et al. |
| 10,341,967 B2 | 7/2019 | Navarro et al. |
| 10,424,973 B1 | 9/2019 | Navarro et al. |
| 10,548,099 B2 | 1/2020 | Navarro et al. |
| 10,778,044 B2 | 9/2020 | Navarro et al. |
| 10,798,665 B2 | 10/2020 | Navarro et al. |
| 10,820,283 B2 | 10/2020 | Davlantes et al. |
| 10,827,445 B2 | 11/2020 | Navarro et al. |
| 10,952,162 B2 | 3/2021 | Navarro et al. |
| 2002/0111905 A1 | 8/2002 | Nagafuchi et al. |
| 2004/0203846 A1 | 10/2004 | Caronni et al. |
| 2005/0090287 A1 | 4/2005 | Rofougaran |
| 2005/0170788 A1 | 8/2005 | Tanaka et al. |
| 2006/0088123 A1 | 4/2006 | Jensen et al. |
| 2007/0155347 A1 | 7/2007 | Heuermann et al. |
| 2007/0156343 A1 | 7/2007 | Rayan et al. |
| 2007/0210899 A1 | 9/2007 | Kato et al. |
| 2007/0243851 A1 | 10/2007 | Shoarinejad et al. |
| 2008/0057880 A1 | 3/2008 | Copeland |
| 2008/0225639 A1 | 9/2008 | Hongou |
| 2009/0210366 A1 | 8/2009 | Sakata et al. |
| 2009/0284082 A1 | 11/2009 | Mohammadian |
| 2010/0033021 A1 | 2/2010 | Bennett |
| 2010/0222010 A1 | 9/2010 | Ozaki et al. |
| 2010/0226448 A1 | 9/2010 | Dent |
| 2011/0141148 A1 | 6/2011 | Hill et al. |
| 2011/0148215 A1 | 6/2011 | Marzetta et al. |
| 2011/0156640 A1 | 6/2011 | Moshfeghi |
| 2011/0216564 A1 | 9/2011 | Swamy |
| 2011/0224817 A1 | 9/2011 | Dubrov et al. |
| 2011/0281535 A1 | 11/2011 | Low et al. |
| 2011/0282535 A1 | 11/2011 | Woody et al. |
| 2012/0109606 A1 | 5/2012 | Dotan et al. |
| 2012/0146425 A1 | 6/2012 | Lee et al. |
| 2012/0217818 A1 | 8/2012 | Yerazunis et al. |
| 2012/0218799 A1 | 8/2012 | Furukawa et al. |
| 2012/0281556 A1 | 11/2012 | Sayana et al. |
| 2012/0300592 A1 | 11/2012 | Perry |
| 2012/0313450 A1 | 12/2012 | Nam et al. |
| 2012/0326660 A1 | 12/2012 | Lu et al. |
| 2013/0043734 A1 | 2/2013 | Stone et al. |
| 2013/0057078 A1 | 3/2013 | Lee et al. |
| 2013/0066471 A1 | 3/2013 | Wang et al. |
| 2013/0102345 A1 | 4/2013 | Jung |
| 2013/0113299 A1 | 5/2013 | Von et al. |
| 2013/0288595 A1 | 10/2013 | Lee et al. |
| 2014/0028110 A1 | 1/2014 | Petersen et al. |
| 2014/0028111 A1 | 1/2014 | Hansen et al. |
| 2014/0062395 A1 | 3/2014 | Kwon et al. |
| 2014/0070621 A9 | 3/2014 | Von Novak et al. |
| 2014/0106761 A1 | 4/2014 | Lee et al. |
| 2014/0133322 A1 | 5/2014 | Steer et al. |
| 2014/0139034 A1 | 5/2014 | Sankar et al. |
| 2014/0203769 A1 | 7/2014 | Keeling et al. |
| 2014/0214743 A1 | 7/2014 | Chester et al. |
| 2014/0227981 A1 | 8/2014 | Pecen et al. |
| 2014/0239305 A1 | 8/2014 | Shah et al. |
| 2014/0242918 A1 | 8/2014 | Weissman et al. |
| 2014/0361741 A1 | 12/2014 | Von et al. |
| 2014/0375253 A1 | 12/2014 | Leabman et al. |
| 2015/0022009 A1 | 1/2015 | Leabman et al. |
| 2015/0123496 A1 | 5/2015 | Leabman et al. |
| 2015/0181539 A1 | 6/2015 | Aiba et al. |
| 2015/0280444 A1 | 10/2015 | Smith et al. |
| 2015/0326061 A1 | 11/2015 | Davison et al. |
| 2015/0349542 A1 | 12/2015 | Yamamoto et al. |
| 2015/0351054 A1 | 12/2015 | Immonen et al. |
| 2015/0357827 A1 | 12/2015 | Muratov et al. |
| 2015/0371771 A1 | 12/2015 | Abu Qahouq |
| 2016/0013656 A1 | 1/2016 | Bell et al. |
| 2016/0026625 A1 | 1/2016 | Walker |
| 2016/0054395 A1 | 2/2016 | Bell et al. |
| 2016/0054396 A1 | 2/2016 | Bell et al. |
| 2016/0056966 A1 | 2/2016 | Bell |
| 2016/0087686 A1 | 3/2016 | Won et al. |
| 2016/0094092 A1 | 3/2016 | Davlantes et al. |
| 2016/0099611 A1 | 4/2016 | Leabman et al. |
| 2016/0099613 A1 | 4/2016 | Bell et al. |
| 2016/0099755 A1 | 4/2016 | Leabman et al. |
| 2016/0099758 A1 | 4/2016 | Bell et al. |
| 2016/0140115 A1 | 5/2016 | Walker |
| 2016/0156268 A1 | 6/2016 | Thomas et al. |
| 2016/0165545 A1 | 6/2016 | Ouchi et al. |
| 2016/0197494 A1 | 7/2016 | Kwon et al. |
| 2016/0216301 A1 | 7/2016 | Holzworth et al. |
| 2016/0233724 A1 | 8/2016 | Bae et al. |
| 2016/0337085 A1 | 11/2016 | Yu et al. |
| 2016/0344431 A1 | 11/2016 | Srirattana et al. |
| 2016/0372948 A1 | 12/2016 | Kvols |
| 2016/0379753 A1 | 12/2016 | Jang et al. |
| 2017/0025885 A1 | 1/2017 | Blakely et al. |
| 2017/0077736 A1 | 3/2017 | Leabman |
| 2017/0201289 A1 | 7/2017 | Zhang et al. |
| 2017/0222469 A1 | 8/2017 | Tustin et al. |
| 2017/0261631 A1 | 9/2017 | Donderici et al. |
| 2017/0288738 A1 | 10/2017 | Lee et al. |
| 2017/0366242 A1 | 12/2017 | Lee et al. |
| 2018/0084406 A1 | 3/2018 | Tandai et al. |
| 2018/0118045 A1 | 5/2018 | Gruzen et al. |
| 2018/0131413 A1 | 5/2018 | Won et al. |
| 2018/0262060 A1 | 9/2018 | Johnston et al. |
| 2018/0349434 A1 | 12/2018 | Seidel |
| 2018/0352519 A1 | 12/2018 | Navarro et al. |
| 2018/0375340 A1 | 12/2018 | Bell et al. |
| 2019/0011523 A1 | 1/2019 | Avestruz et al. |
| 2019/0013702 A1 | 1/2019 | Muratov |
| 2019/0020225 A1 | 1/2019 | Kwon et al. |
| 2019/0132098 A1 | 5/2019 | Wernersson et al. |
| 2019/0140350 A1* | 5/2019 | Urzhumov ............... H01Q 3/26 |
| 2019/0173324 A1 | 6/2019 | Arnitz et al. |

(56) References Cited

U.S. PATENT DOCUMENTS

| | | | |
|---|---|---|---|
| 2019/0296547 A1 | 9/2019 | Kelly et al. | |
| 2019/0341812 A1* | 11/2019 | Arnstein | H01Q 15/148 |
| 2019/0364492 A1 | 11/2019 | Azizi et al. | |
| 2020/0266673 A1 | 8/2020 | Reynolds et al. | |
| 2020/0396702 A1 | 12/2020 | Navarro et al. | |
| 2020/0403451 A1 | 12/2020 | Davlantes | |
| 2021/0063605 A1 | 3/2021 | Raeker et al. | |

FOREIGN PATENT DOCUMENTS

| | | | |
|---|---|---|---|
| JP | 2003108972 A | 4/2003 | |
| JP | 2009048353 A | 3/2009 | |
| JP | 2013050899 A | 3/2013 | |
| JP | 2015039271 A | 2/2015 | |
| JP | 2016111791 A | 6/2016 | |
| JP | 2017093234 A | 5/2017 | |
| JP | 2018506252 A | 3/2018 | |
| WO | 2006080304 A1 | 8/2006 | |
| WO | 2016109316 A1 | 7/2016 | |
| WO | 2021121087 A1 | 6/2021 | |

OTHER PUBLICATIONS

Brown, William C., "The history of power transmission by radio waves" IEEE Transactions on microwave theory and techniques 32, No. 9 (1984): 1230-1242.

Harrington, Roger F., "Effect of Antenna Size on Gain, Bandwidth, and Efficiency", Journal of Research of the National Bureau of Standards—D. Radio Propagation vol. 64D, No. 1, Jan.-Feb. 1960., 12 pages.

Ivrlac, Michel T., "High-Efficiency Super-Gain Antenna Arrays", 2010 International ITG Workshop on Smart Antennas (WSA 2010), 369-374.

Kumar, et al., "Memetic search in differential evolution algorithm." In:arXiv preprint. Aug. 1, 2014 Retreived from <https://arxiv.org/ftp/arxiv/papers/1408/1408.0101.pdf> entire document.

Wang, Shaodi, et al., "PROCEED: A Pareto optimization-based circuit-level evaluator for emerging devices", IEEE Transactions on Very Large Scale Integration (VLSI) Systems. Feb. 12, 2015.

Younesiraad, Hemn, et al., "Optimal Huygens' Metasurface for Wireless Power Transfer Efficiency Improvement", IEEE access [online] Nov. 30, 2020 https://ieeexplore.ieee.org/document/9273051 Digital Object Identifier 10.1109/ACCESS.2020.3041337.

* cited by examiner

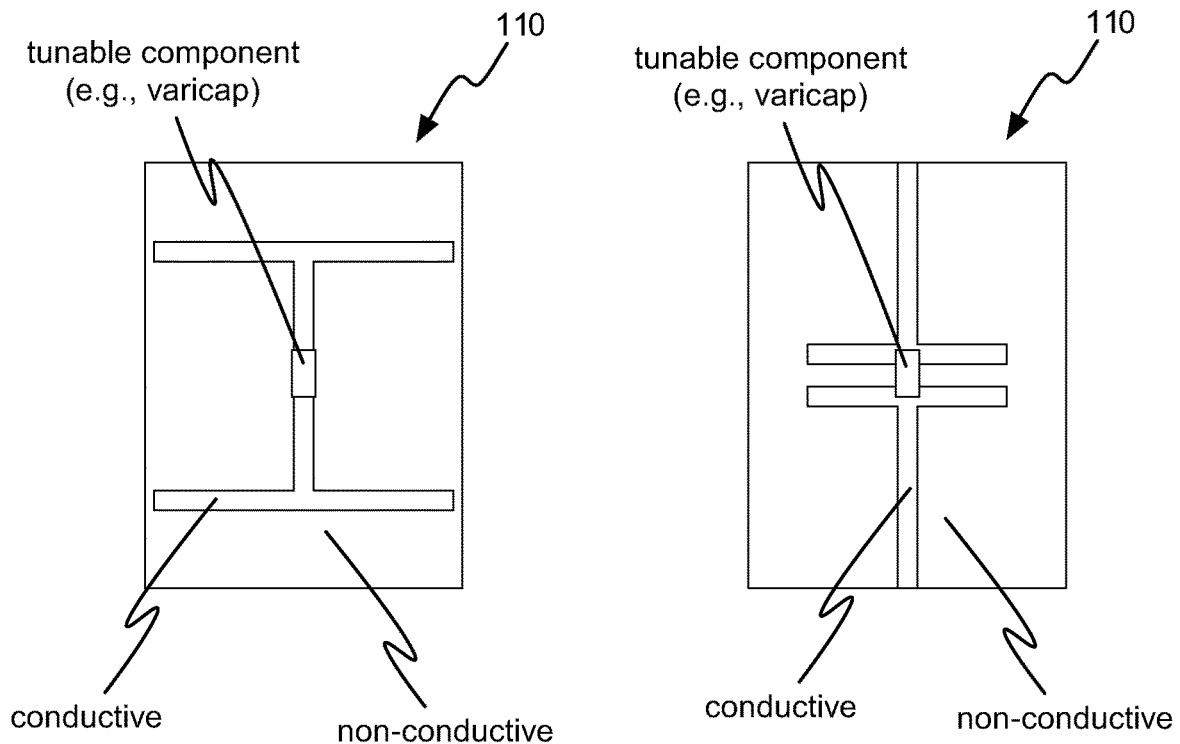
FIGURE 5A
FIGURE 5B
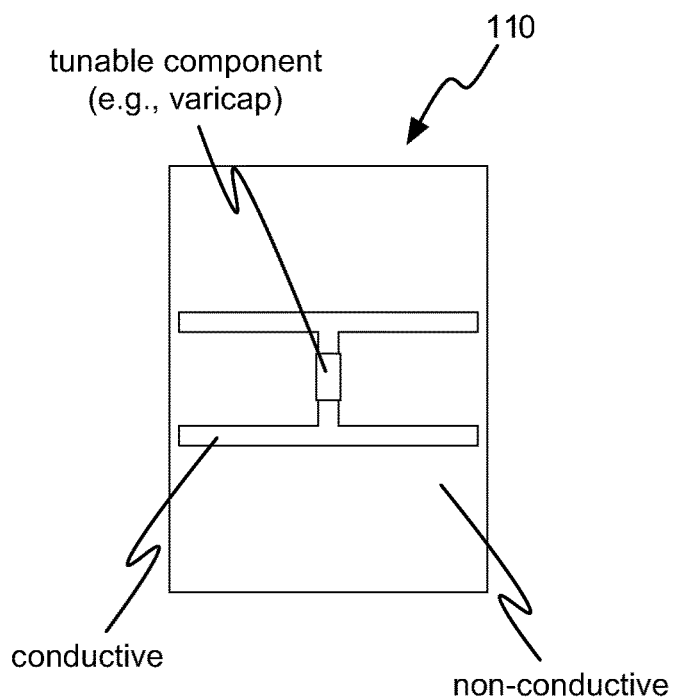
FIGURE 5C

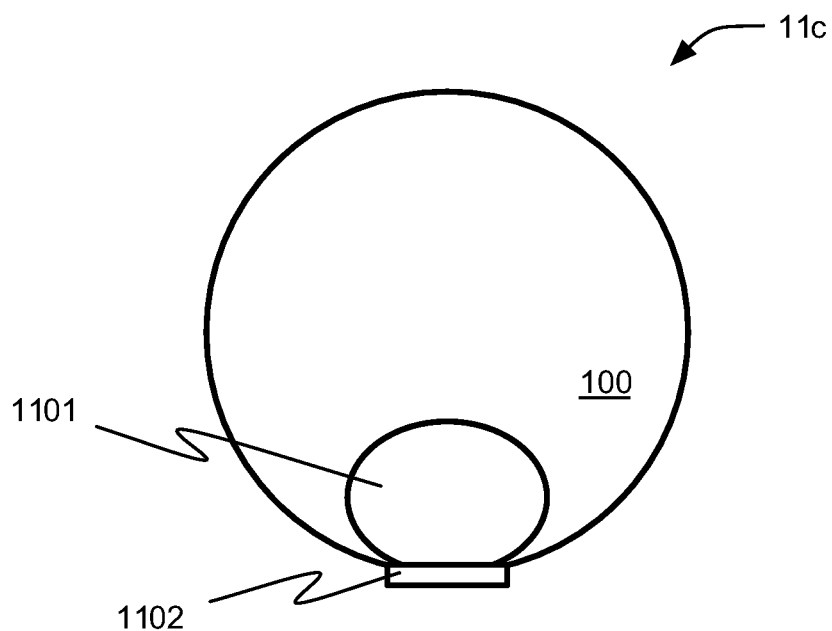
FIGURE 6A
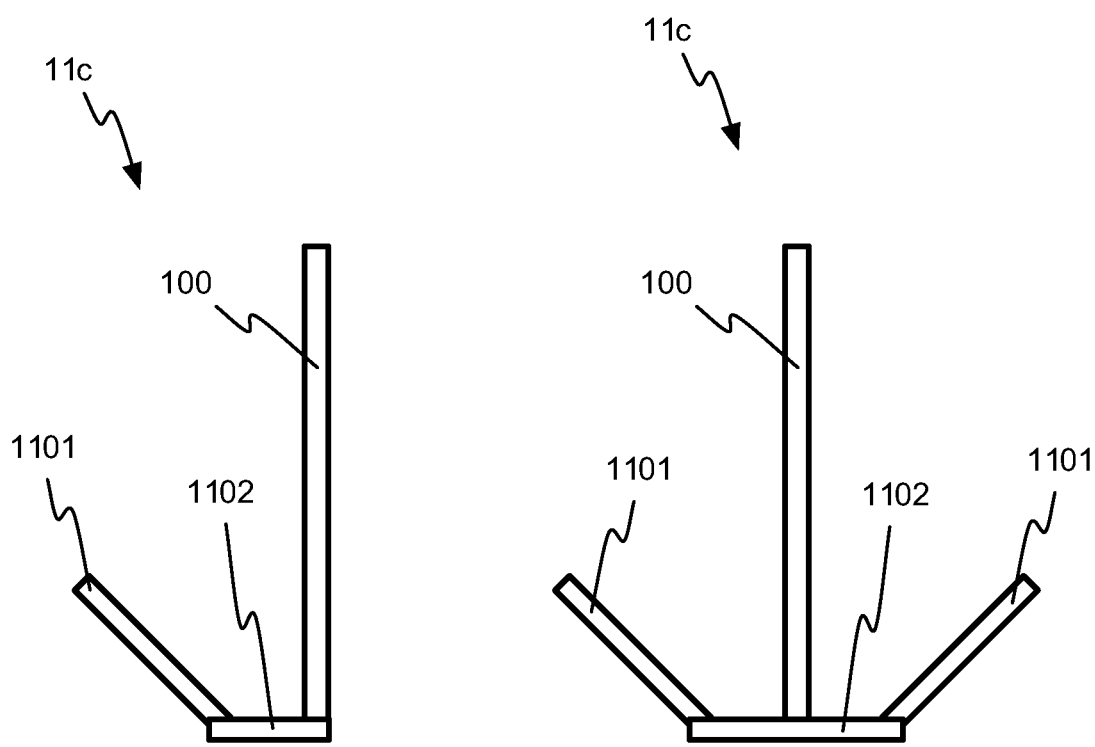
FIGURE 6B        FIGURE 6C

SYSTEM AND METHOD FOR WIRELESS POWER NETWORKING

CROSS-REFERENCE TO RELATED APPLICATIONS

This application claims the benefit of U.S. Provisional Application Ser. No. 63/174,992, filed on 14 Apr. 2021, and of U.S. Provisional Application Ser. No. 63/319,226, filed on 11 Mar. 2022, each of which is incorporated in its entirety by this reference.

STATEMENT OF GOVERNMENT SUPPORT

This invention was made with government support under Contract No. FA8650-21-C-C314 awarded by the Air Force Research Laboratory. The government has certain rights in the invention.

TECHNICAL FIELD

This invention relates generally to the wireless power field, and more specifically to a new and useful system and method for wireless power networking.

BACKGROUND

Typical point-to-point wireless power links are limited in the range over which power can be efficiently transmitted, and may require and/or benefit from unobstructed (e.g., line-of-sight) transmission paths. Thus, there is a need in the wireless power field to create a new and useful system and method for wireless power networking.

BRIEF DESCRIPTION OF THE FIGURES

FIGS. 5A-5C are schematic representations of a first, second, and third specific example, respectively, of a reactive cell.

FIGS. 6A-6B are a front view and a side view, respectively, of an example of a relay node of the system.

FIG. 6C is a side view of a variation of the example of the relay node.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview.

A system 10 for wireless power networking preferably includes one or more nodes 11 (e.g., as shown in FIGS. 1A-1E). The system preferably functions to form a power network (e.g., mesh network) configured to transfer power wirelessly between nodes of the system, preferably via transmission (e.g., at one or more transmit nodes) and reception (e.g., at one or more receive nodes) of propagating electromagnetic radiation (e.g., propagating radio frequency (RF) modes).

Figure 2A:
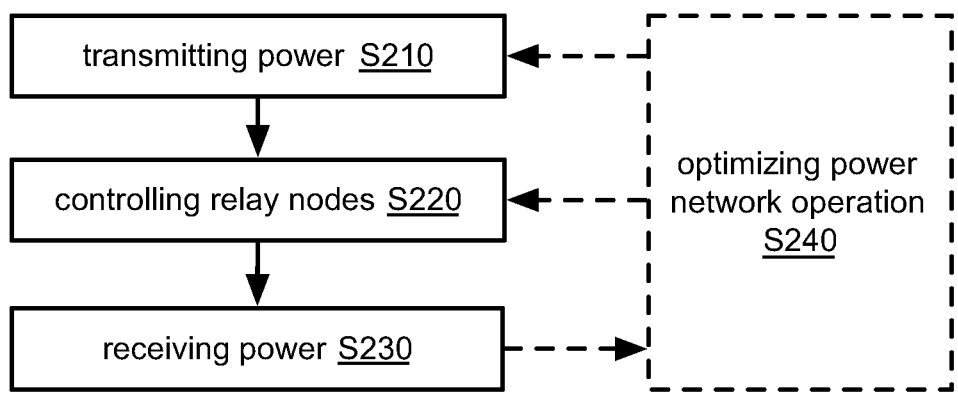
FIG. 2A is a schematic representation of an embodiment of a method for wireless power networking.
Figure 2B:
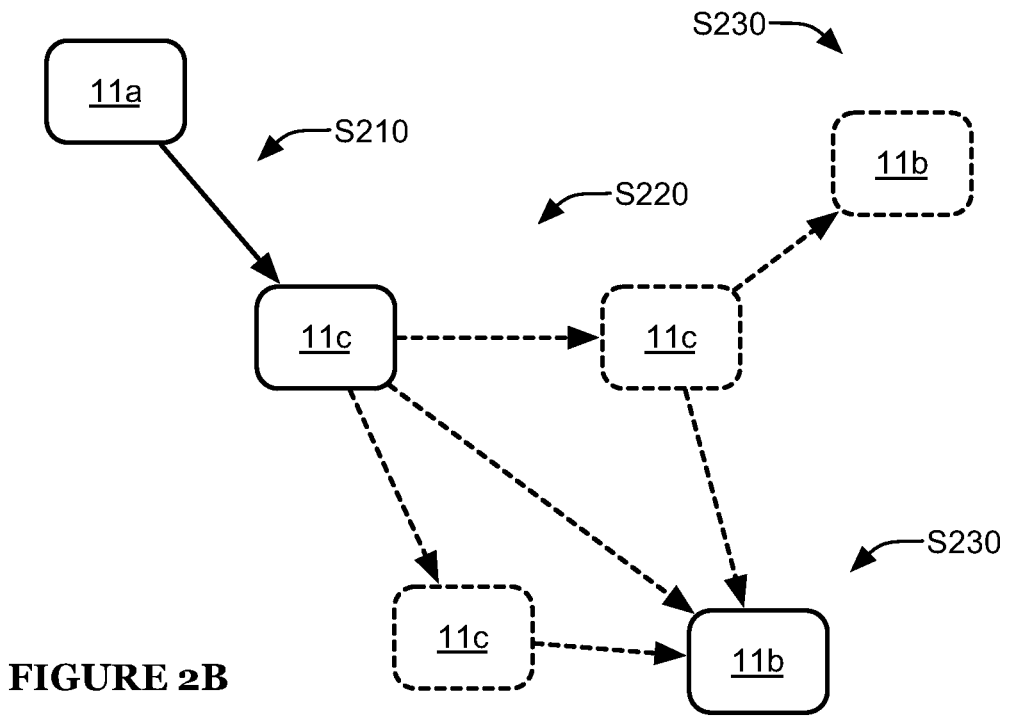
FIG. 2B is a schematic representation of an example of the method.

A method 20 for wireless power networking preferably includes transmitting power S210, controlling relay nodes S220, and/or receiving power S230, and optionally includes optimizing power network operation S240 (e.g., as shown in FIGS. 2A-2B and/or 7C). The method 20 is preferably performed at (e.g., by one or more nodes of) the system 10, but can additionally or alternatively be performed by any other suitable system(s).

In some examples, the system 10 and/or method 20 can include one or more elements such as described in U.S. patent application Ser. No. 17/028,408, filed 23 Sep. 2020 and titled "METHOD AND SYSTEM FOR WIRELESS POWER DELIVERY"; U.S. patent application Ser. No. 17/015,473, filed 9 Sep. 2020 and titled "SYSTEM AND METHOD FOR WIRELESS POWER RECEPTION"; U.S. patent application Ser. No. 17/006,242, filed 28 Aug. 2020 and titled "METHOD AND SYSTEM FOR WIRELESS POWER DELIVERY"; U.S. patent application Ser. No. 16/706,131, filed 6 Dec. 2019 and titled "METHOD AND SYSTEM FOR WIRELESS POWER DELIVERY"; U.S. patent application Ser. No. 16/539,288, filed 13 Aug. 2019 and titled "METHOD AND SYSTEM FOR WIRELESS POWER DELIVERY"; and/or U.S. patent application Ser. No. 16/899,473, filed 11 Jun. 2020 and titled "METHODS AND SYSTEMS FOR MULTI-OBJECTIVE OPTIMIZATION AND/OR WIRELESS POWER DELIVERY", each of which is herein incorporated in its entirety by this reference. For example, the system 10 can include one or more 'transmitters' and/or 'receivers' such as described in U.S. patent application Ser. No. 17/028,408 (e.g., wherein each 'transmitter' or 'receiver' as described in U.S. patent application Ser. No. 17/028,408 is, or is included in, a different node 11 of the system 10), and/or the method 20 can include transmitting power such as described in U.S. patent application Ser. No. 17/028,408 regarding the 'method for wireless power delivery' and/or one or more elements thereof (e.g., transmitting power S210 can include 'determining transmitter-receiver proximity S100', 'determining transmission parameter values S200', and/or 'transmitting power based on the transmission parameter values S300' as described in U.S. patent application Ser. No. 17/028,408).

2. System.

As described above, the system preferably includes one or more nodes 11. The nodes can include one or more: transmit nodes 11a, receive nodes 11b, and/or relay nodes 11c (and/or any other suitable nodes). The transmit nodes 11a preferably function to transfer power via transmission of propagating electromagnetic radiation (e.g., transmit RF power) to other nodes of the system. The receive nodes 11b preferably function to receive power via reception of propagating electromagnetic radiation (e.g., receive RF power) from other nodes of the system. The relay nodes 11c preferably function to relay power transmissions between other nodes of the system.

Figure 7A:
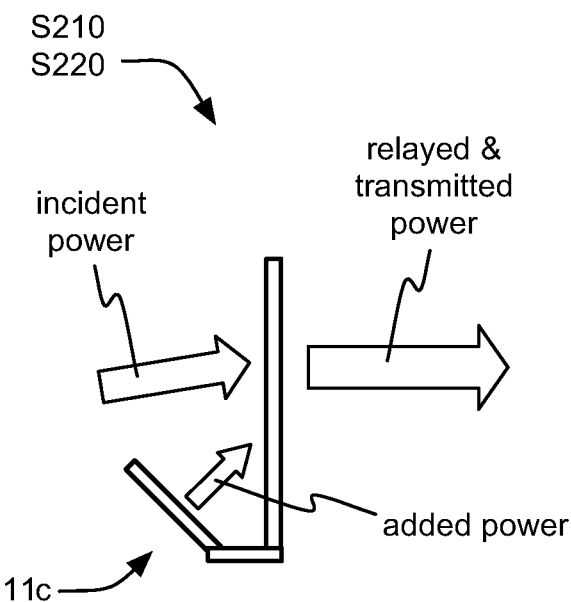
FIGS. 7A-7B are schematic representations of examples of portions of the method.
Figure 7B:
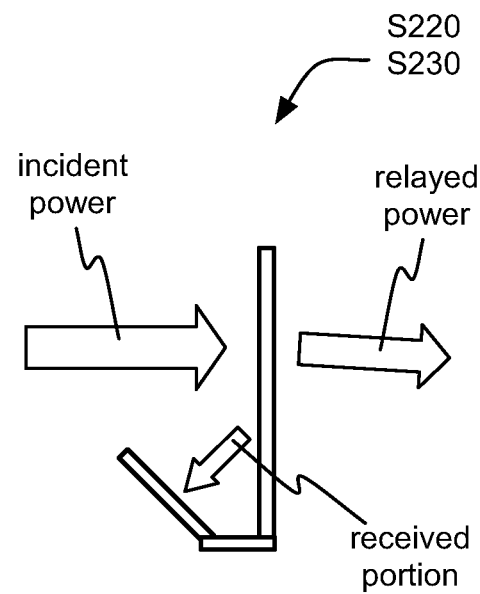
Figure 7C:
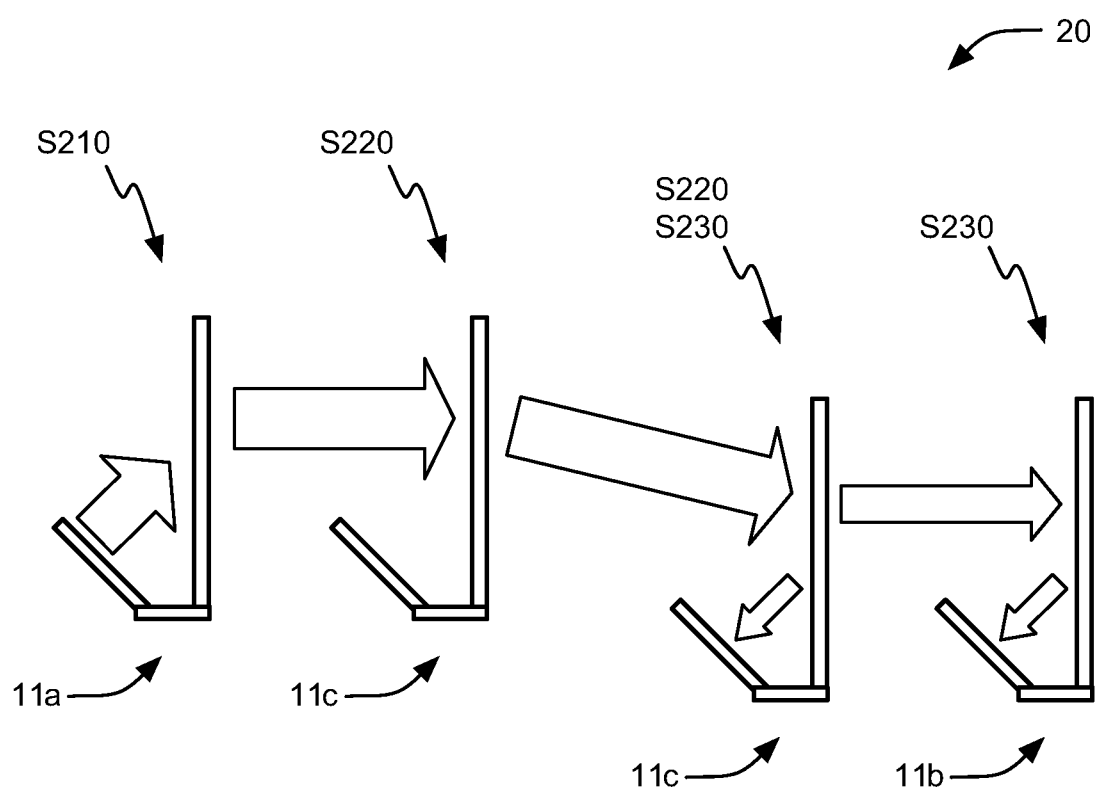
FIG. 7C is a schematic representation of an example of the method.

In some examples, some or all nodes 11 of the system can be hybrid nodes configured to perform multiple functions, such as transmitting, receiving, and/or relaying. For example, a relay node can additionally or alternatively be configured to transmit and/or receive, such as concurrent with and/or at different times from performing a relay function. In a first specific example, this can include splitting incident power into a relayed portion (e.g., redirected as described in more detail regarding the relay nodes 11c) and a received portion (e.g., converted into electrical power at the node, such as described in more detail regarding the receive nodes 11b), such as shown by way of examples in FIGS. 7B-7C. In a second specific example, this can include relaying incident power while also transmitting additional power (e.g., both redirecting the incident power into and adding more power into a desired output beam, such as shown by way of example in FIG. 7A). In some examples, a node may be configured to either transmit or receive power (e.g., optionally while also relaying power), but not both, whereas in other examples, a node may have bidirectional capabilities (e.g., being configured to either transmit or receive power, optionally while also relaying power).

In some examples, one or more nodes of the system (e.g., transmit nodes and/or relay nodes) are operable to produce beam-like RF modes (e.g., Gaussian beams, Bessel beams, hybrids thereof, and/or approximations thereof, etc.), such as described below in more detail regarding the method 20.

Some or all nodes can optionally include a wireless communication module, but can additionally or alternatively include wired communication modules or any other suitable communication modules, or can omit communication modules. The wireless communication modules preferably support (e.g., enable communication using) one or more wireless communication protocols (e.g., WiFi, Bluetooth, BLE, NFC, RF, IR, Zigbee, Z-wave, etc.).

Each node (or a subset thereof) can include one or more controllers configured to control node operation (e.g., configure node operation mode, such as controlling the node between transmit, receive, relay, and/or hybrid modes of operation; configure node parameters, such as power transmission, modulation, and/or reception parameters; control communication with other nodes and/or other elements of the system; etc.). However, the receive nodes can additionally or alternatively be controlled in any other suitable manner, and/or can be uncontrolled or substantially uncontrolled.

However, the transmitters and receivers can additionally or alternatively include any other suitable elements.

Figure 1A:
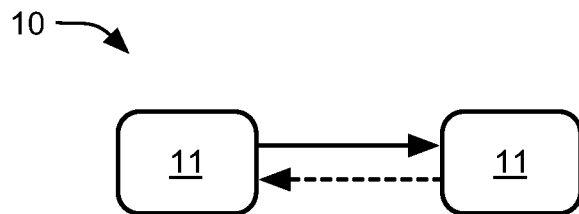
FIGS. 1A-1H are schematic representations of a various examples of an embodiment of a system for wireless power networking.
Figure 1B:
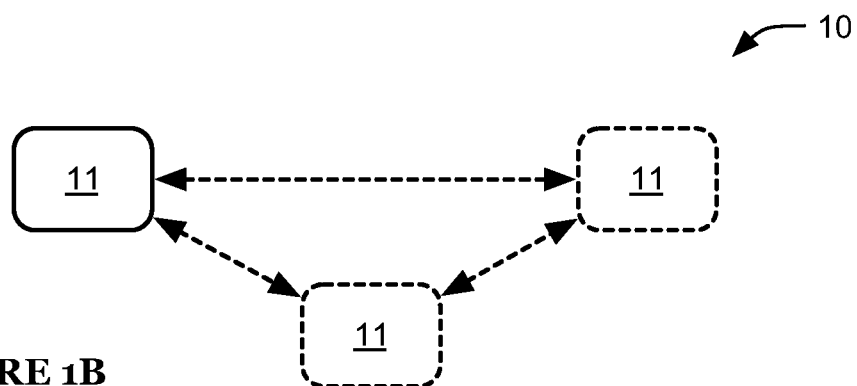
Figure 1C:
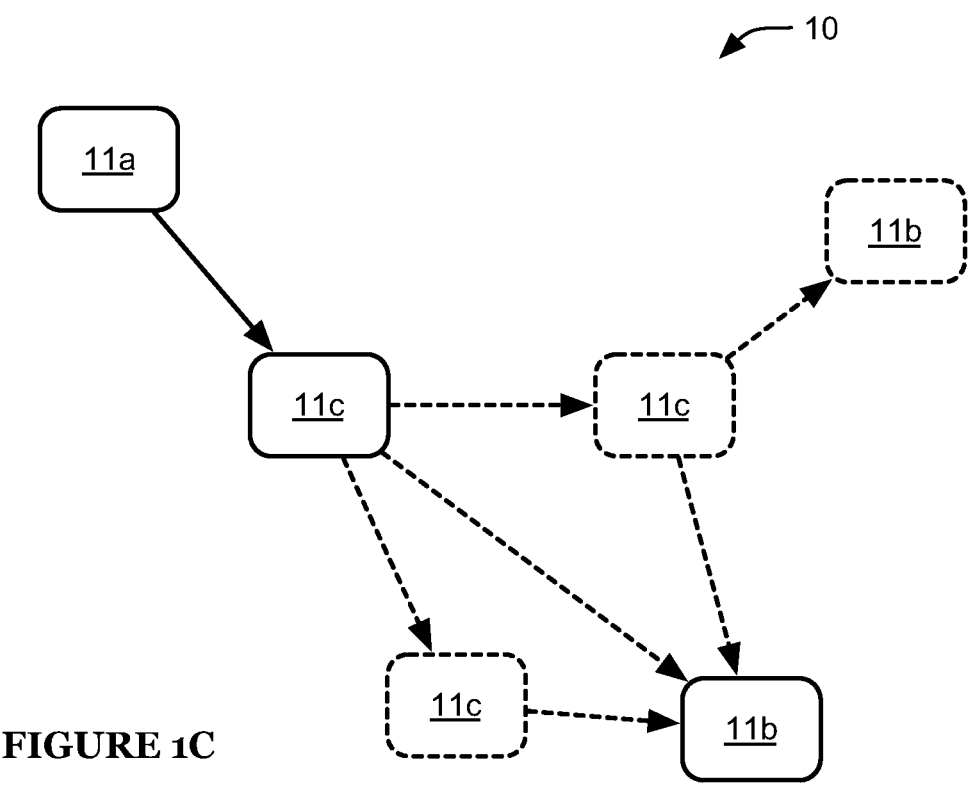
Figure 1D:
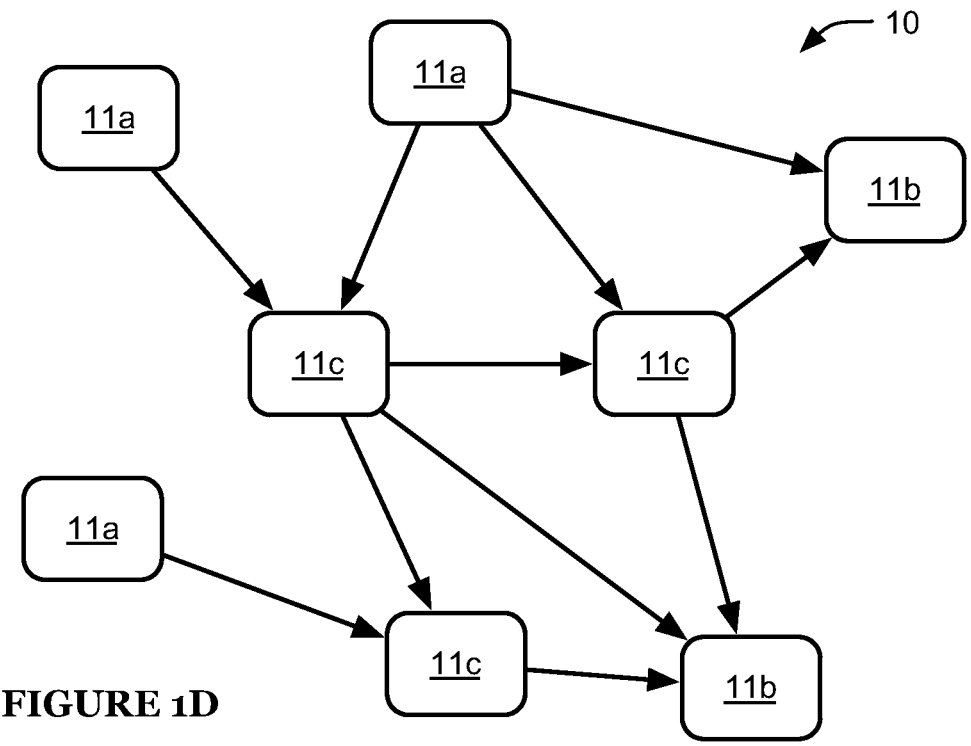
Figure 1E:
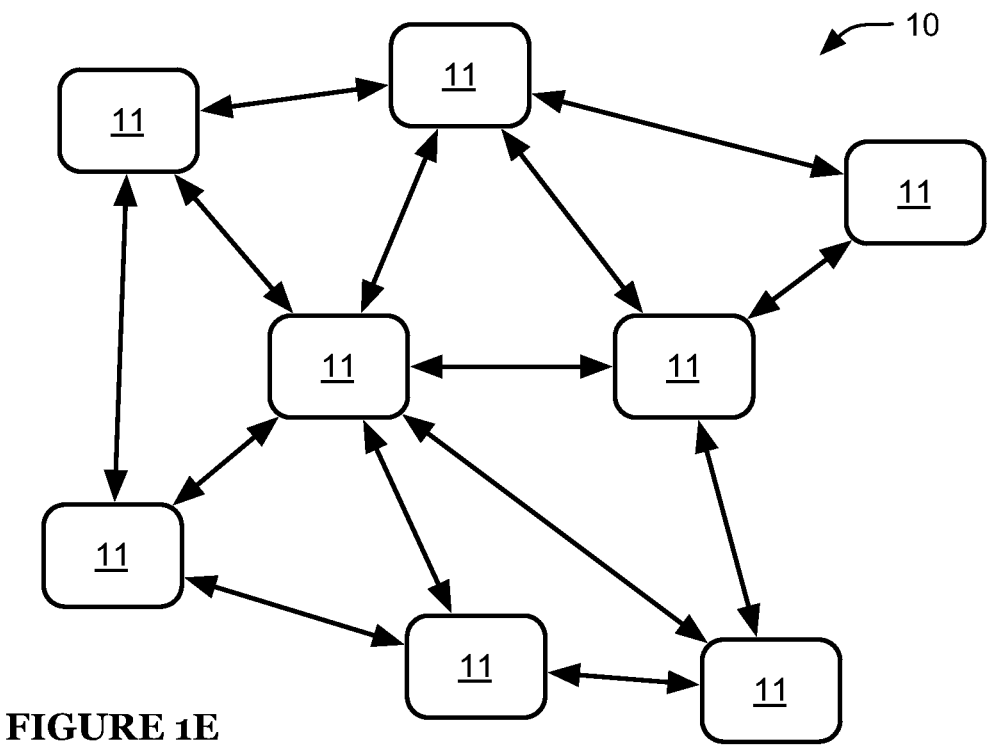
Figure 1F:
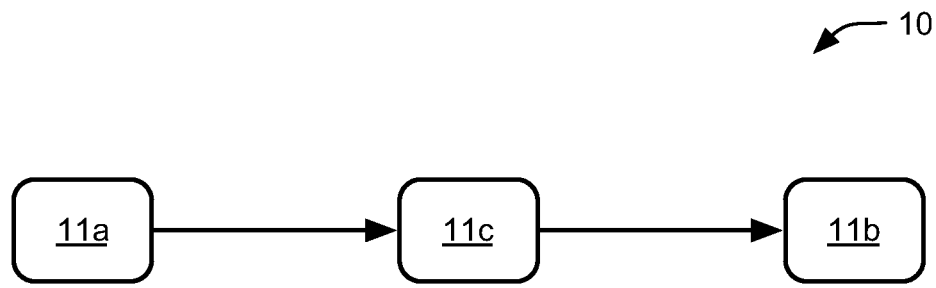
Figure 1G:
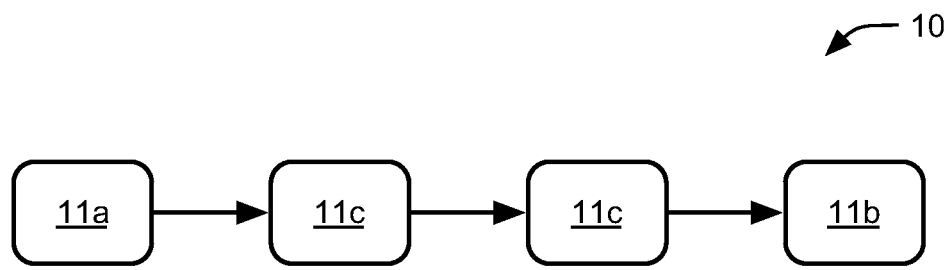
Figure 1H:
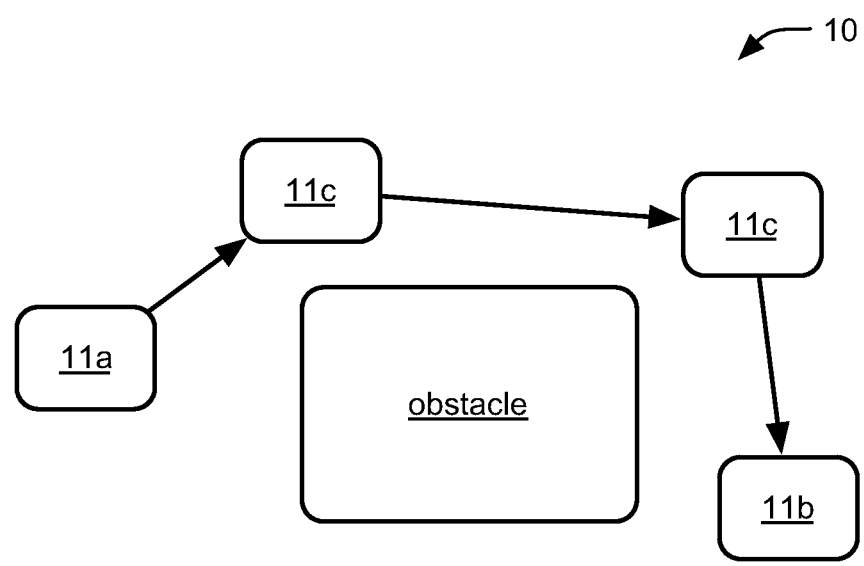

In a first example, the system can include one transmit node 11a, one receive node 11b, and one or more relay nodes 11c arranged between the transmit node and the receive node (e.g., as shown in FIGS. 1F-1H). In a second example, the system can include one transmit node 11a, a plurality of receive nodes 11b, and one or more relay nodes 11c arranged between the transmit node and the receive nodes (e.g., as shown in FIG. 1C). In a third example, the system can include a plurality of transmit nodes 11a, one or more receive nodes 11b, and one or more relay nodes 11c arranged between some or all of the transmit and receive nodes (e.g., as shown in FIG. 1D).

In some examples, the nodes may have an arbitrary and/or dynamic arrangement with respect to each other. In one example, the system includes one or more transmit nodes (e.g., with fixed positions), one or more receive nodes that undergo numerous changes in position and orientation (e.g., with respect to the transmitter, each other, etc.) over time, and one or more relay nodes that may have fixed or varying positions. The system can optionally be arranged in a setting in which other nearby objects (e.g., obstacles to wireless power transmission) can also have an arbitrary and/or dynamic arrangement with respect to the elements of the system. However, the system can define any other suitable arrangements.

However, the system can additionally or alternatively include any other suitable number of nodes of any suitable type, having any suitable arrangement.

2.1 Transmit Node.

As described above, the transmit nodes 11a preferably function to transmit RF power to one or more other nodes of the system.

In some embodiments, the transmit nodes of the system can include one or more antennas (e.g., configured to transmit electromagnetic radiation, such as RF and/or microwave power), preferably defining a controllable (e.g., adaptive) antenna array (e.g., linear array, planar array, 3-D array, etc.; phased array, electronically controllable array, etc.).

The antenna array preferably includes a plurality of active antennas (e.g., antennas configured to be actively driven by feeds), more preferably independently controllable active antennas (e.g., wherein each active antenna can be individually controlled independent of all other active antennas of the system; wherein groups of active antennas can be controlled together, wherein each group is controllable independently from all other groups; etc.). In a first variation, the amplitude and/or phase at which each active antenna is driven can be independently controlled (e.g., via a separate IQ modulator or phase shifter for each active antenna). In a second variation, the active antennas are separated into one or more antenna groups, wherein the antennas of a group are controlled together (e.g., via a single IQ modulator or phase shifter for each group). For example, the antennas of a group can have a fixed phase offset (e.g., zero offset, such as wherein all antenna of the group have the same phase as each other; non-zero offset; etc.) with respect to each other (e.g., wherein the fixed phase offset is defined by differences in trace lengths between the IQ modulator or phase shifter and each antenna). However, the active antennas can additionally or alternatively be configured in any other suitable manner.

The antenna array can additionally or alternatively include one or more passive antennas (e.g., configured to electrically and/or resonantly couple to one or more of the active antennas, thereby altering antenna array transmission characteristics). In one example, the system is configured to control (e.g., via switches, such as software-controlled switches; via elements with variable electrical properties, such as variable capacitors; etc.) electrical coupling (e.g., connection, resonant coupling, etc.) and/or decoupling of one or more of the passive antennas to one or more electrical components (e.g., passive components, such as resistors, capacitors, and/or inductors; antennas, such as one or more of the active antennas and/or other passive antennas; etc.). In a first example, a plurality of passive antennas can be electrically connected to and/or disconnected from each other (e.g., via switches operable to electrically connect two or more such antennas). In a second example, variable capacitors (e.g., varactors) and/or other variable (e.g., continuously-variable) elements are electrically coupled (e.g., electrically connected) to one or more passive antennas, enabling control of the loading of the passive antennas and/or their coupling to other antennas (e.g., other passive antennas, active antennas, etc.) in the array and/or their feeds (e.g., wherein varying the properties of one or more of the variable elements coupled to the antennas can function to control the net pattern of the array). In a specific example of this second example, an adaptive antenna array includes a single active antenna and a plurality of passive antennas, wherein one or more of the passive antennas are electrically coupled to one or more variable components.

Each transmit node is preferably electrically connected (e.g., via wired connections, inductive coupling, etc.) to one or more electrical power sources (e.g., power storage elements such as batteries and/or supercapacitors, generators such as internal combustion engine-based generators and/or steam turbines, utility-scale power grids, etc.), and is preferably operable to draw power from the one or more electrical power sources in order to power the transmit node. However, the transmit nodes can additionally or alternatively have any other suitable power connections.

Each transmit node preferably includes one or more controllers configured to control transmit node operation (e.g., control transmission, such as controlling the phased array to transmit propagating radiation of one or more desired modes, control communication with other nodes and/or other elements of the system, etc.). However, the transmit nodes can additionally or alternatively be controlled in any other suitable manner.

In some examples, each transmit node 11a (or a subset thereof) can include one or more elements such as described in U.S. patent application Ser. No. 17/028,408, filed 23 Sep. 2020 and titled "METHOD AND SYSTEM FOR WIRELESS POWER DELIVERY" which is herein incorporated in its entirety by this reference. For example, a transmit node 11a can include (or be) a 'transmitter' (or one or more elements thereof, such as the one or more antennas) such as described in U.S. patent application Ser. No. 17/028,408.

However, the system can additionally or alternatively include any other suitable transmit nodes having any other suitable elements.

2.2 Receive Node.

As described above, the receive nodes 11b preferably function to receive RF power from one or more other nodes of the system.

In some embodiments, the receive nodes of the system can include one or more antennas (e.g., configured to receive electromagnetic radiation transmitted by the transmitters). The receivers can optionally include and/or be electrically coupled to (e.g., configured to deliver electrical power to) one or more client devices (e.g., batteries and/or battery-containing devices, such as electrical and/or electronic user devices). Each receive node can optionally include one or more buffer energy stores (e.g., batteries, capacitors such as supercapacitors, etc.), such as a battery electrically coupled between the antenna(s) and the client device (e.g., between the antenna(s) and an electrical output configured to connect to the client device), which can function as a buffer between the antennas (which may provide power at an uneven rate and/or with uneven characteristics) and the client device (which may require and/or benefit from power provision at a substantially constant rate and/or with substantially constant characteristics, which may be temporarily disconnected from the receive node, etc.).

Each receive node can optionally include one or more controllers configured to control receive node operation (e.g., control power reception and/or handling, such as controlling antenna tuning, impedance matching, rectification, and the like; control communication with other nodes and/or other elements of the system; etc.). However, the receive nodes can additionally or alternatively be controlled in any other suitable manner, and/or can be uncontrolled or substantially uncontrolled.

In some examples, each receive node 11b (or a subset thereof) can include one or more elements such as described in U.S. patent application Ser. No. 17/028,408, filed 23 Sep. 2020 and titled "METHOD AND SYSTEM FOR WIRELESS POWER DELIVERY", and/or in U.S. patent application Ser. No. 17/015,473, filed 9 Sep. 2020 and titled "SYSTEM AND METHOD FOR WIRELESS POWER RECEPTION", each of which is herein incorporated in its entirety by this reference. For example, a receive node 11b can include (or be) a 'receiver' (or one or more elements thereof, such as the one or more antennas and/or client devices) as described in U.S. patent application Ser. No. 17/028,408, and/or can include (or be) the 'system 100 for wireless power reception' (or one or more elements thereof, such as the 'antennas 110', 'dynamic impedance matches 120', 'RF-DC converters 130', 'DC impedance converters 140', and/or 'DC power outputs 150') as described in U.S. patent application Ser. No. 17/015,473.

However, the system can additionally or alternatively include any other suitable receive nodes having any other suitable elements.

2.3 Relay Node.

As described above, the relay nodes 11c preferably function to relay power transmissions between other nodes of the system. For example, an RF power transmission from a transmit node (or from an upstream relay node) can be relayed by the relay node toward a receive node (or a downstream relay node).

In a first embodiment, the relay nodes can function to receive (e.g., absorb) and re-transmit RF power. In this embodiment, each relay node can include one or more phased arrays (e.g., wherein the relay node absorbs the received power and uses it to drive the phased array to re-transmit the power).

In a second embodiment, the relay nodes can function to modulate (e.g., redirect, refocus, etc.) RF power transmissions incident upon them (e.g., without absorbing the RF power, aside from parasitic absorption). In this embodiment, the relay node can include one or more phase-shifting surfaces, such as transmitarrays, reflectarrays, and/or hybrids thereof. In some examples, the phase-shifting surfaces can include one or more metasurfaces 100 (and/or any other suitable metamaterial elements), such as described below in more detail.

Each relay node preferably includes one or configurable elements (e.g., wherein the configurable elements can be actively controlled to change the properties of the outgoing RF power). However, the relay node can alternatively include only fixed and/or passive elements, such as wherein the properties of the outgoing RF power are substantially unchanged during use of the relay node (or are substantially changed only by the characteristics of the incoming RF power incident on the relay node). However, the relay nodes can additionally or alternatively include any other suitable elements with any other suitable functionalities.

Figure 3A:
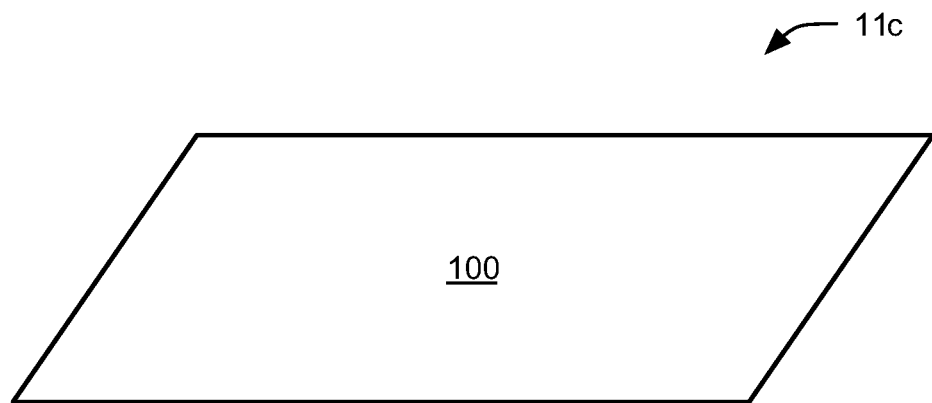
FIG. 3A is an isometric view of an embodiment of a metasurface of the system.

As described above, relay nodes operable to modulate RF power transmissions can include one or more metasurfaces 100 (e.g., as shown in FIG. 3A). The metasurface (e.g., metamaterial slab, preferably of subwavelength thickness, including a plurality of polarizable meta-atoms of subwavelength size) can function to modulate RF power transmissions (e.g., of a particular wavelength or wavelength range) that are incident on the metasurface, such as to redirect and/or refocus the incident RF power (e.g., into one or more beam-like modes), preferably directing this power toward another mesh node (or multiple other mesh nodes) of the system. The metasurface can be a Huygens metasurface (e.g., bianisotropic Huygens metasurface), but can additionally or alternatively be any other suitable metasurface. In one example, in which a beam-like mode (e.g., Gaussian beam) is directed toward a relay node by an upstream node, the metasurface can function to redirect and refocus the beam-like mode toward a downstream node (e.g., into a Gaussian beam having different characteristics from the Gaussian beam incident on the relay node).

Figure 3B:
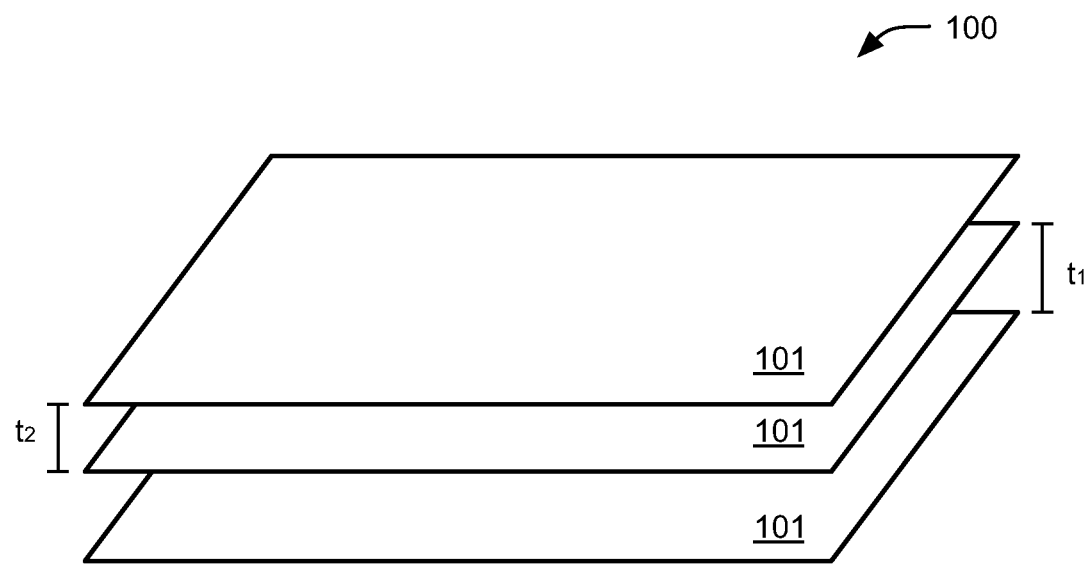
FIG. 3B is a detail isometric view of a portion of an example of the metasurface.

The metasurface 100 preferably includes a plurality of impedance sheets 101. In some embodiments, the metasurface includes three or more impedance sheets 101, such as three or more substantially parallel impedance sheets. The impedance sheets are preferably separated from each other in space (e.g., by air, dielectric, insulator, etc.), such as shown by way of example in FIG. 3B. The separation between impedance sheets can be uniform or non-uniform, or the impedance sheets can be arranged in any other suitable manner.

The impedance sheets can function to enable modulation of the incident RF power. In some examples, a metasurface having three or more impedance sheets can enable substantially arbitrary modulation (or an approximation thereof, such as an approximation limited by in-plane spatial discretization of the impedance sheets). For example, controlling the impedance of the three impedance sheets can correspond analogously to controlling three material properties of the metasurface, such as the magnetic surface admittance, electric surface impedance, and magnetoelectric coupling coefficient. In examples in which the metasurface includes more than three impedance sheets, these additional impedance sheets can provide additional degrees of freedom, which may enable a range of "degenerate" tuning configurations for any given desired modulation properties (e.g., desired phase shift imposed on incident RF power), as opposed to situations in which exactly three impedance sheets may lead to exactly one tuning configuration that corresponds to the desired properties (e.g., phase shift imposed). In contrast, metasurfaces including fewer than three impedance sheets (e.g., one impedance sheet or two impedance sheets) may not be able to achieve arbitrary modulation, but may still be able to achieve some degree of control over the modulation of incident RF power.

Figure 4A:
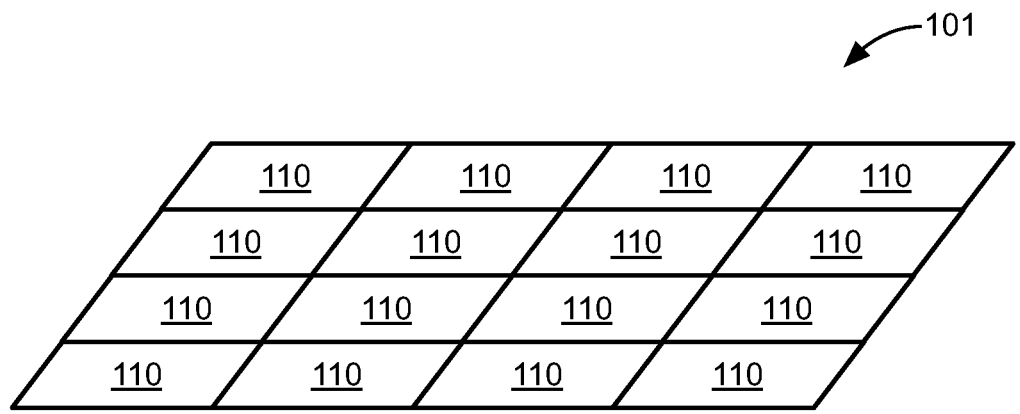
FIG. 4A is an isometric view of an embodiment of an impedance sheet of the metasurface.
Figure 4B:
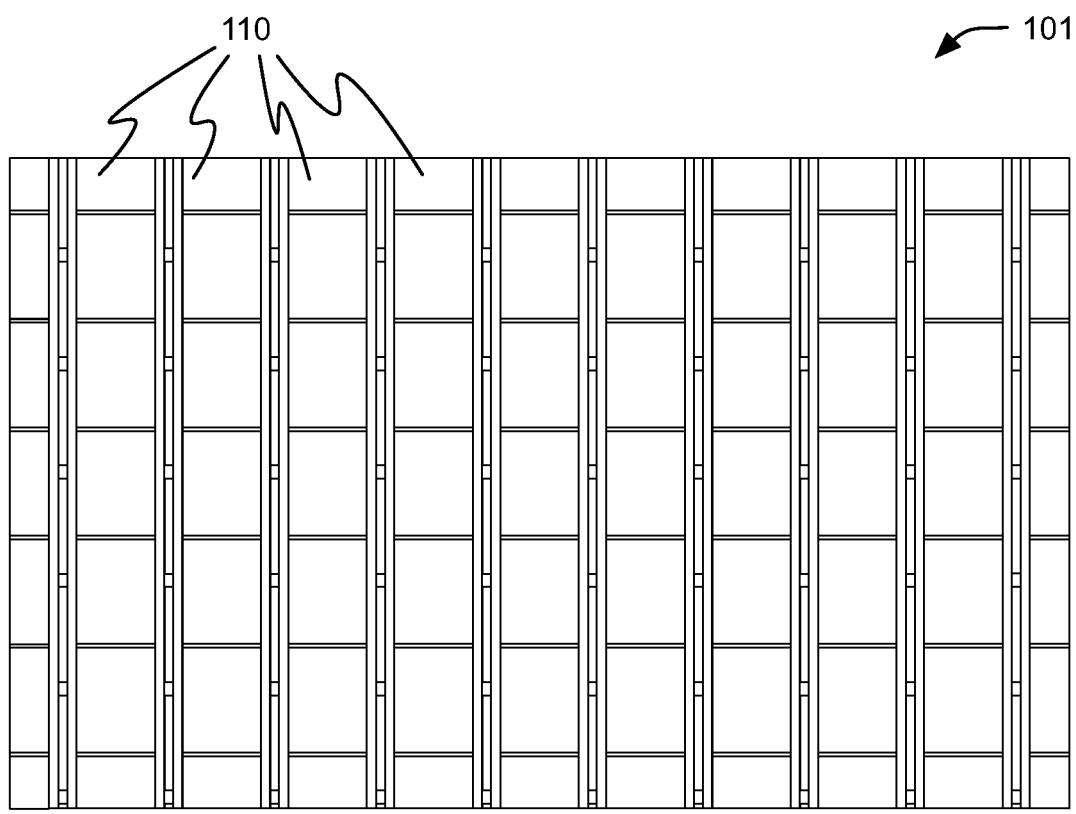
FIG. 4B is a plan view of a specific example of the impedance sheet.

Each sheet preferably includes a plurality of reactive cells 110 (e.g., as shown in FIGS. 4A-4B). The reactive cells preferably function to present a particular (e.g., arbitrary and/or tunable) electromagnetic reactance to incident RF power (e.g., of a particular frequency). Each reactive cell preferably includes one or more electromagnetic resonator networks, such as inductor-capacitor (LC) networks that include at least one inductive element and at least one capacitive element. In one embodiment, each cell includes a parallel LC network, such as shown by way of example in FIGS. 4B-4D, which depicts an example cell structure and a corresponding equivalent network diagram. Parallel LC networks can offer favorable tunability properties, as (in an idealized case) their reactance (as a function of inductance and/or capacitance) includes a pole and two zeros (one approached from the negative side and the other from the positive side), which can enable tunability over a broad range of reactances. In alternate embodiments, one or more cells (e.g., all cells) can include one or more series LC networks and/or series-parallel LC networks. However, the cells can additionally or alternatively include any other suitable resonator networks.

Each resonator network is preferably tunable (e.g., configured to be actively controlled). For example, each resonator network can include one or more variable components (e.g., arranged in the inductive and/or capacitive path of an LC network, such as a parallel LC network), such as biased variable capacitors (e.g., in which the variable capacitor bias is electrically controlled), reactive elements connected to a switch bank, and/or any other suitable tunable lumped elements. The variable components are preferably arranged at locations of high voltage and/or current (e.g., locations at which the voltage and/or current induced by incident RF power is high, such as locations at which it is maximized or within a threshold fraction of maximal), which can function to increase the effect of these components on the resonant properties of the network, but can additionally or alternatively have any other suitable arrangement. In one example, each resonator network is a parallel LC network that includes a variable component (e.g., varicap and/or other component operable to alter its capacitance) connected along its inductive path.

In some embodiments, the variable components can include tunable capacitive elements and/or components operable to tune any other suitable electromagnetic properties, switch between different operation modes, and/or otherwise affect the resonance properties of the resonator network. In examples, these components can include one or more: diode varactors, MEMS varactors, liquid crystal-based components, liquid metal-based components, liquid dielectric-based components, phase transition material-based components, PIN diodes, MEMS switches, dielectric actuator-based components, ferrite-based components, piezoelectric-based components, components based on one or more electrically and/or magnetically polarizable structures, and/or any other suitable component types. For example, the effective dielectric constant of the substrate may be tuned through one or more of: piezoelectric structures, liquid crystals, electrically and/or magnetically polarizable structures, and/or any other suitable structures.

Diode varactors can be controlled by application of a bias voltage, which can function to control the varactor capacitance (e.g., wherein continuous control of the applied voltage leads to continuous control of the resulting capacitance). In some examples, the intrinsic diode resistance may result in high losses.

MEMS varactors can be controlled by control signals that function to select between discrete capacitance values (e.g., wherein fine-grained control between many such values may be achieved), often with low losses. Some examples of these components may be relatively expensive, and so may be undesirable for use in some cost-sensitive applications.

Liquid crystal-based components can be controlled by application of a (quasi-static) electric field, which alters the liquid crystal's dielectric constant (e.g., and thus, the capacitance of the component). These components typically enable very low losses (e.g., even at high frequencies, such as RF) and continuous tunability (e.g., wherein continuous control of the applied electric field strength leads to continuous control of the dielectric constant, and thus of the capacitance). In some examples, these components can be expensive and/or complicated to incorporate into standard PCB assemblies.

Liquid metal-based components and liquid dielectric-based components can be controlled by use of applied electric fields and/or other microfluidic techniques to controllably reconfigure metallic and dielectric structures, respectively, thereby altering one or more of the component's electrical properties (e.g., capacitance). These components can typically enable low losses and continuous tunability. In some examples, these components can be complicated to incorporate into standard PCB assemblies.

Phase transition material-based components can be controlled by applying and/or removing heat to induce phase changes in the material, thereby altering its electromagnetic material properties (e.g., conductivity, dielectric constant, etc.) and thus the electrical properties of the component. These components can typically enable high frequency operation. In some examples, these components may cause high losses (e.g., several dB of loss), can be complicated to incorporate into standard PCB assemblies, and/or can be limited in tunability (e.g., offering only binary on/off control).

Switch components (e.g., PIN diodes, MEMS switches, etc.) can function to alter the network impedance, such as by switching the switch state (e.g., wherein, by switching the switch closed or open, one or more other circuit elements and/or conductive regions are electrically coupled to or decoupled from the network, respectively, via the switch). PIN diodes can be operable as switches, wherein a bias voltage can control the diode to switch between a closed state (e.g., wherein the diode is conductive) and an open state (e.g., wherein the network is substantially open across the diode). In some examples, PIN diodes may cause high losses (e.g., several dB of loss), and/or are typically limited in tunability (e.g., offering only binary on/off control). MEMS switches can be controlled by control signals that function to select between an open state and a closed state. Some examples of MEMS switches may be relatively expensive, and so may be undesirable for use in some cost-sensitive applications; further, they are typically limited in tunability (e.g., offering only binary on/off control).

Dielectric actuator-based components (e.g., including one or more dielectric elastomers) can be controlled by application of a (quasi-static) electric field, which alters the dimensions of the dielectric, thereby altering the capacitance of the component (e.g., by changing the distance between the conductive portions). These components can enable low losses and/or continuous tunability (e.g., wherein continuous control of the applied electric field strength leads to continuous control of the dielectric dimensions, and thus of the capacitance). In some examples, these components can be complicated to incorporate into standard PCB assemblies.

Ferrite-based components can be controlled by application of a (quasi-static) magnetic field, which controls the ferrite saturation, and thus the ferrite permeability. Accordingly, the application of the magnetic field can enable control over properties of the component, such as control over its inductance. Although continuous control of the applied magnetic field strength could lead to continuous control of the ferrite permeability, and thus of the component inductance, many ferrite-based components will offer only limited tunability (e.g., offering only binary on/off control). In some examples, these components may cause high losses (e.g., several dB of loss), and/or may require non-negligible amounts of power to control (e.g., due to power requirements associated with generation of the magnetic fields to apply).

However, the resonator networks can additionally or alternatively include any other suitable variable components, and/or some or all of the resonator networks can alternatively include only fixed components.

In some embodiments, the resonator networks can be configured to meet one or more tunability objectives. First, in some examples, the resonator networks can be configured to maximize (and/or exceed a threshold value of) an achievable range of reactances (the imaginary component of the impedance) that can be reached via resonator network tuning (e.g., over the range of tunability afforded by the one or more variable components of the resonator network). For example, the reactance as a function of a variable component parameter (e.g., capacitance) can include and/or approach one or more poles and zeros, thereby sweeping from (or near) zero to (or toward) both positive and negative infinity. Over this range of achievable reactance values (or over a subset thereof, such as a subset corresponding to likely operational ranges), the resonator networks can be configured to enable minimization (and/or reduction to below a threshold value) of resistance (the real component of the impedance). For example, the resonator network parameters can be selected to minimize (or reduce) an integral over the achievable or desired range of reactances (or a weighted integral, weighted based on likely or anticipated frequent operation ranges). In some examples, in which the resonator network includes multiple tunable components, the increased number of degrees of freedom afforded by these multiple components can result in "degenerate" reactances (e.g., wherein a particular reactance value can be achieved by more than one tuning configurations, wherein the different "degenerate" tuning configurations may correspond to different resistance values). In such examples, the system can be configured to operate using the tuning parameters that result in the lowest resistance of all the configurations corresponding to the desired reactance (or to a reactance value sufficiently close to the desired value, such as within a threshold tolerance from the desired value). However, the reactive cells can additionally or alternatively be configured in any other suitable manner.

Figure 4C:
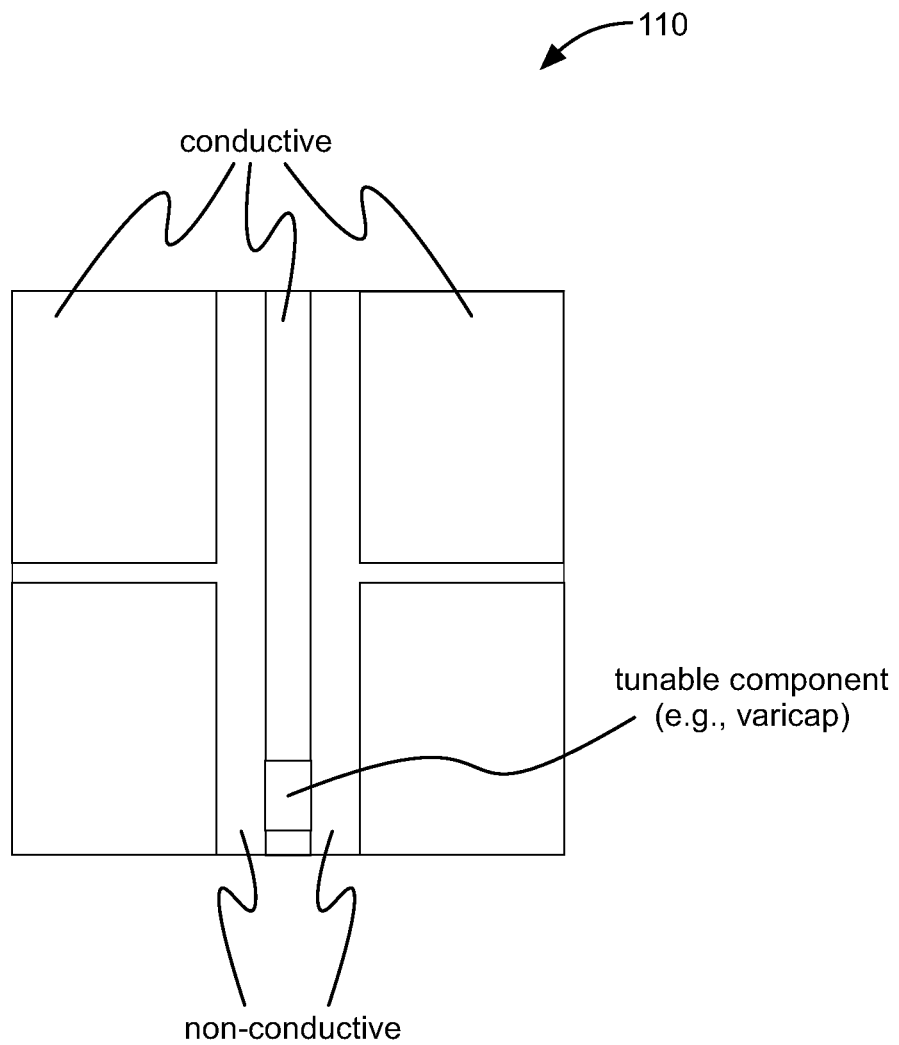
FIG. 4C is a detail plan view of a reactive cell of the impedance sheet depicted in FIG. 4B.
Figure 4D:
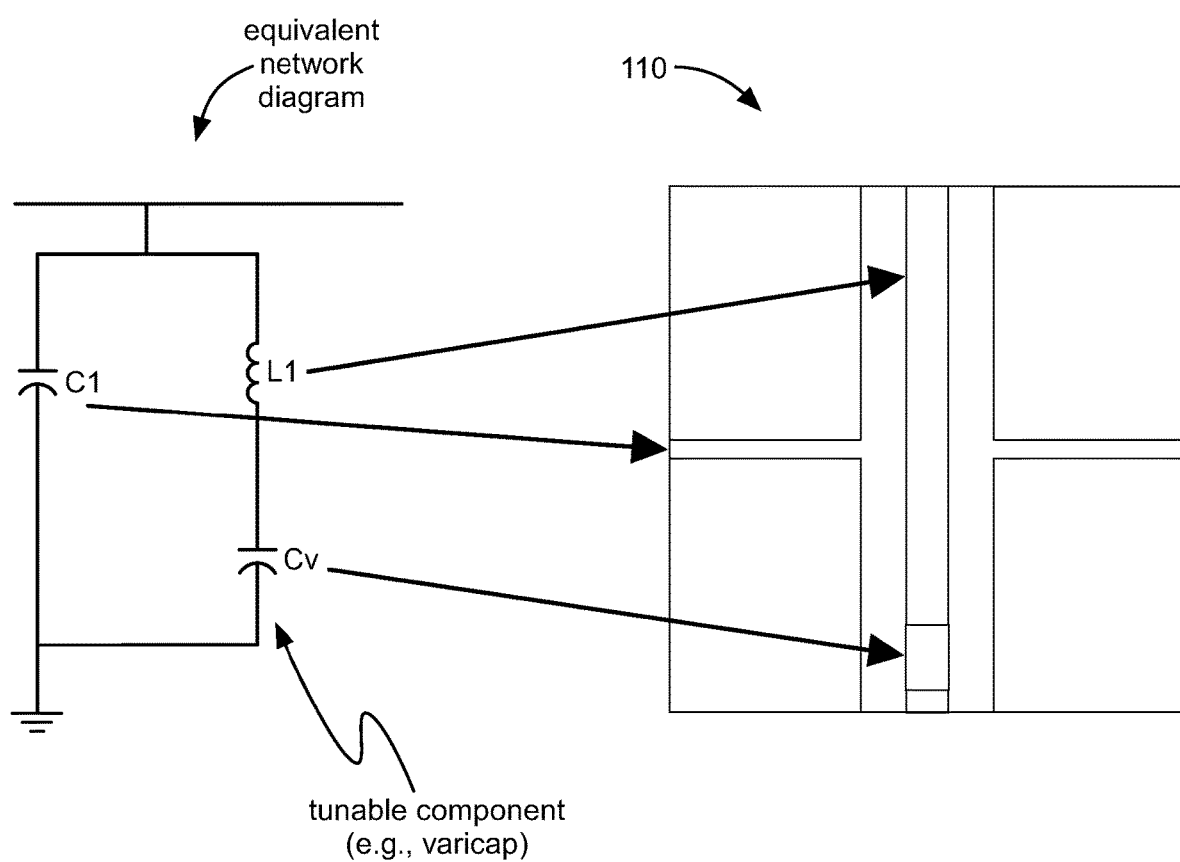
FIG. 4D is a schematic representation of an equivalent network corresponding to the reactive cell depicted in FIG. 4C.

In a first embodiment of a reactive cell including a parallel LC network, the reactive cell has a metallic structure, such as shown by way of example in FIGS. 4B-4C. In this embodiment, the structure preferably includes two metallic regions with a thin non-conductive strip separating them, thereby defining the capacitive path of the parallel LC network. Additionally, the structure preferably includes a metallic strip (e.g., thin metallic strip) arranged orthogonal (or substantially orthogonal) to the non-conductive strip of the capacitive path, wherein this metallic strip defines an inductive path in parallel with the capacitive path. In some examples, the structure can include a tunable capacitive element (e.g., varicap, such as a surface-mount technology varicap) arranged along the metallic strip (e.g., in series with the metallic strip) of the inductive path. The tunable element is preferably voltage-controlled (but can additionally or alternatively be controlled in any other suitable manner). For example, the structure can include a thin bias conductor running substantially orthogonal to the inductive path, thereby enabling control of the tunable element while reducing interaction of the bias conductor with the RF power present at the node.

In a second embodiment, the reactive cell can be the Babinet equivalent of the structure described above regarding the first embodiment (e.g., as shown in FIGS. 5A-5C). In this embodiment, the structure is the complement of the structure of the first embodiment, wherein metallic regions of the first embodiment are replaced by non-conductive regions, and non-conductive regions of the first embodiment are replaced by metallic regions. In this embodiment, the tunable capacitive element is preferably rotated 90° (relative to its orientation in the first embodiment), thereby capacitively connecting the two parallel metallic strips that bound the non-conductive strip at which the tunable element is located. In a variation of this embodiment (e.g., as shown in FIGS. 5A and/or 5C), the tunable capacitive element is located along the single metallic strip that runs between the parallel metal strips, rather than bridging the non-conductive strip between those two parallel metallic strips.

In a third embodiment, the reactive cell has a dielectric structure. For example, the cell can include one or more dielectric resonators (e.g., dielectric disks) coupled to a transmission line that includes a tunable capacitive element.

However, the impedance sheet can additionally or alternatively include any other suitable reactive cells having any suitable structures and/or arrangements.

Each impedance sheet can include a regular array (e.g., rectangular array) of substantially identical reactive cells 110 (e.g., as shown in FIG. 4B). Alternatively, reactive cells of a sheet can differ from each other and/or have any other suitable arrangement with respect to each other. Further, the sheets can have the same cells and/or arrangement of cells as one another, or each sheet (or a subset thereof) can have different cells and/or cell arrangements from the other sheets.

Figure 5D:
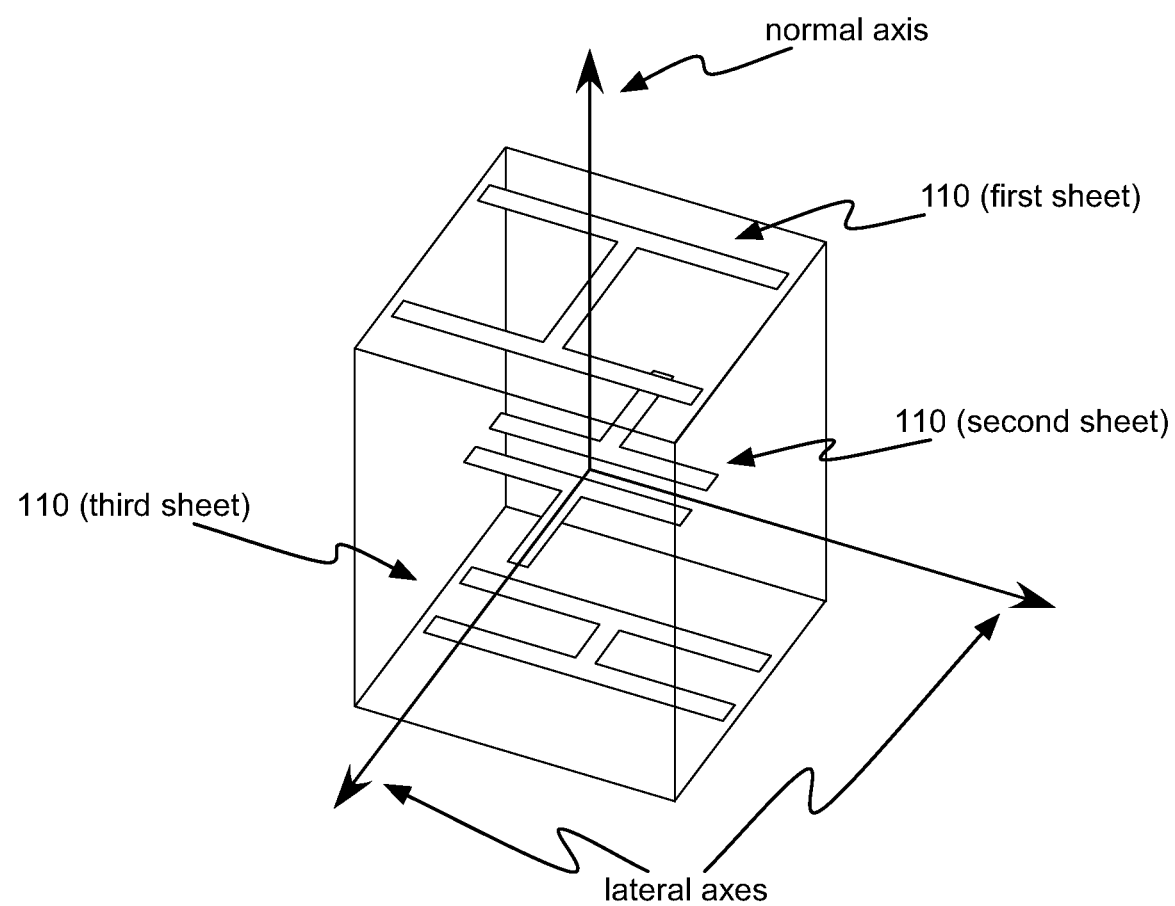
FIG. 5D is a schematic representation of a specific example of reactive cells of three impedance sheets.

In a first example, each sheet includes a rectangular array of reactive cells, in which the unit cell dimensions of the array of each sheet are identical (or substantially identical). The reactive cells of the three sheets (or a subset thereof) may be substantially aligned with one another along a reference axis normal to the three sheets ('normal axis'), wherein features of each cell (e.g., capacitive elements such as separations between conductive pads, inductive elements such as conductive strips, etc.) are aligned along the reference axis with corresponding features of cells of the other sheets (e.g., capacitive elements of the first sheet aligned with corresponding capacitive elements of the other sheets, inductive elements of the first sheet aligned with corresponding inductive elements of the other sheets, etc.). Additionally or alternatively, the cells of one or more sheets may be displaced laterally (e.g., within the plane of the sheet, orthogonal to the reference axis) from those of one or more other sheets, such as displaced (along one or more lateral axes, such as axes defined by the rectangular array and/or axes substantially parallel and/or orthogonal to reactive cell features, such as boundaries between conductive and non-conductive regions), such as displaced by a fractional amount (e.g., ½, ¼, ⅛, ⅓, ⅙, etc.) of a unit cell dimension (e.g., the unit cell dimension corresponding to the lateral axis along which the displacement is defined). In a specific example (e.g., as shown in FIG. 5D), the reactive cells of the first and third sheets are substantially aligned with each other, whereas the reactive cells of the second sheet (arranged between the first and third sheets) is displaced by half the unit cell dimension along one of the lateral axes of the array (e.g., an axis orthogonal to a long axis defined by an inductive element of the reactive cell).

In embodiments in which the metasurface (e.g., or one or more impedance sheets thereof) is not actively tunable (e.g., does not include any tunable elements), the reactive cells of the metasurface can differ from each other in order to achieve the desired (fixed) modulation properties (e.g., fixed lensing behavior), such as refocusing an incident Gaussian beam received from a first node (e.g., transmit node or upstream relay node) into a different Gaussian beam directed toward a third node (e.g., receive node or downstream relay node). For example, the aspect ratios and/or dimensions of the reactive cells and/or the elements thereof can differ between the different reactive cells of the impedance sheet and/or the metasurface; additionally or alternatively, the structure and/or equivalent circuits of some reactive cells may differ from others.

In a variation of these embodiments, in which the metasurface (or one or more elements thereof) is actively tunable, the reactive cells of the metasurface can differ from each other in order to achieve the desired baseline modulation properties (e.g., lensing behavior, such as described above), wherein the tunable elements can be used to control the modulation properties (e.g., control in a property space around the baseline, such as altering one or more characteristics of the lensing behavior). In examples, such control can be used to adapt to (e.g., optimize based on) changing circumstances, such as changes in position and/or modulation properties of one or more upstream and/or downstream nodes, changes in the environment (e.g., introduction, change in position, and/or removal of one or more obstacles, changes in environmental conditions such as temperature and/or humidity, etc.), changes in desired behavior (e.g., reversal of beam transmission direction, change of upstream and/or downstream target, etc.), and/or any other suitable changes. In a specific example, in which the baseline properties are configured to refocus an incident Gaussian beam received from a first node into a different Gaussian beam directed toward a third node, in response to a change in position of the third node, the modulation properties can be controlled to alter the properties of the Gaussian beam so that it is directed toward the new location of the third node; analogously, in response to a change in position of the first node, the modulation properties can be controlled such that the Gaussian beam is still directed toward the third node, despite the change in properties of the incoming Gaussian beam (arising from the change in position of the first node). However, the modulation properties can additionally or alternatively be controlled in any other suitable manner.

However, the metasurface can additionally or alternatively include any other suitable elements in any suitable arrangement.

In some examples (e.g., examples in which the relay node can additionally function as a transmit and/or receive node), the relay node can optionally include one or more feeding structures 1101 (e.g., as shown in FIGS. 6A-6C), such as structures operable to feed power into the metasurface (e.g., to be transmitted, optionally along with redirected power incident on the relay node) and/or receive power from the metasurface (e.g., power incident on the metasurface, which the metasurface redirects toward the feeding structure). The feeding structure(s) can be connected to the metasurface by one or more mechanical supports 1102, and/or by any other suitable elements (but can alternatively not be connected to the metasurface). In such examples, the relay node can optionally include one or more elements such as described above regarding the transmit and/or receive nodes (e.g., to enable and/or facilitate power transmission and/or reception), such as one or more electrical power sources and/or stores.

In some such examples, it may be preferable to include multiple feeding structures in each such relay node, which can increase the efficiency of coupling power into and/or out of the feeding structures (e.g., depending on the properties of the incident power and/or desired properties of the transmitted output power). For example, by including a feeding structure on either side of the metasurface, power incident on the metasurface could be reflected to the feeding structure on the same side of the metasurface, rather than being transmitted through the metasurface, thereby avoiding ohmic losses associated with transmission through the metasurface (and analogously, power to be transmitted in a particular direction can be provided from the feeding structure positioned to enable reflection, rather than transmission). Further, additional feeding structures arranged in different locations could enable further reduction of such losses, in an analogous manner.

Each relay node can optionally include one or more controllers configured to control relay node operation (e.g., control modulation of incident radiation, such as controlling one or more tunable elements of the metasurface(s) to effect desired modulation; control feeding structure operation, such as controlling power input to and/or reception from the metasurface; control communication with other nodes and/or other elements of the system, etc.). However, the relay node can additionally or alternatively be controlled in any other suitable manner, or can be uncontrolled or substantially uncontrolled (e.g., in the case of a non-tunable metasurface).

However, the system can additionally or alternatively include any other suitable elements having any suitable functionality.

3. Method.

As described above, the method 20 for wireless power networking preferably includes transmitting power S210, controlling relay nodes S220, and/or receiving power S230. The method can optionally include optimizing power network operation S240. The method preferably functions to efficiently transmit power wirelessly through a network (e.g., mesh network) of nodes, such as the network defined by the system 10 described above.

3.1 Transmitting Power.

Transmitting power S210 preferably functions to generate one or more RF power transmissions within the network. S210 is preferably performed at one or more transmit nodes. Each transmit node preferably directs a power transmission toward one or more other nodes (e.g., relay nodes, receive nodes, etc.) of the network. The transmit node preferably transmits a beam-like mode (e.g., Gaussian beam, Bessel beam, a hybrid thereof, etc.) directed toward the downstream node. Optionally, the transmit node can generate multiple beam-like modes and/or any other suitable modes (e.g., for transmissions directed toward multiple nodes). However, S210 can additionally or alternatively include transmitting power in any other suitable manner.

3.2 Controlling Relay Nodes.

Controlling relay nodes S220 preferably functions to control one or more relay nodes to relay power transmissions from upstream nodes to downstream nodes. S220 preferably includes controlling each relay node that receives RF power during performance of the method (e.g., power transmitted toward the node in S210, power directed toward the node by one or more other relay nodes in S220, etc.). However, S220 can additionally or alternatively include controlling any other set of one or more relay nodes.

S220 preferably includes controlling a relay node to relay RF power to a downstream node (or nodes) along a desired transmission path (e.g., transmission path from one or more transmit nodes to one or more receive nodes via one or more relay nodes). The relay node is preferably controlled to modulate RF power incident upon it in order to define a beam-like mode directed toward the next node downstream of the relay node being controlled. In examples, the beam-like modes can include Gaussian beams, Bessel beams, hybrids thereof, and/or any other suitable beam-like modes. Optionally, the relay node can be controlled to modulate the incident RF power into multiple beam-like modes and/or any other suitable modes (e.g., in order to relay power simultaneously to multiple downstream nodes).

The relay node is preferably controlled based on: known incident power characteristics (e.g., incoming phase characteristics and/or beam-like mode characteristics); downstream node position (e.g., relative to the relay node being controlled); characteristics of the relay node being controlled and the downstream node, such as characteristics related to the size (e.g., aperture radius, width area, etc.) of the electromagnetic element (e.g., phase-shifting surface, phased array, receiver, etc.) of the nodes and/or any other suitable information.

In some examples, the relay node can be controlled based further on one or more targets for link efficiency between the relay node and the downstream node. For example, for any given desired RF mode, each node of the link can be associated with a respective area coverage fraction (e.g., corresponding to the fraction of power associated with the mode that intersects the aperture of the respective node's electromagnetic element). To meet a particular link efficiency target $\eta$, the product of these two area coverage fractions ($\epsilon_r$, corresponding to the relay node, and $\epsilon_d$, corresponding to the downstream node) must be greater than the target: $\epsilon_r \epsilon_d \geq \eta$.

In one such example, S220 includes controlling a relay node to direct a Gaussian beam toward the downstream node. In this example (as well as in some other examples), a larger beam waist can be beneficial because a larger beam waist corresponds to a smaller derivative of phase with respect to change in position (e.g., radial position r outward from the beam axis, corresponding to a phase derivative $\partial_\varphi/\partial_r$, but additionally or alternatively axial position z along the beam axis and/or any other suitable spatial parameter(s)). This smaller phase derivative value can enable a more accurate discretized approximation of the desired mode to be realized at the relay node, wherein a discretization is used to map the desired mode onto the set of discrete reactive cells defining the metasurface. Accordingly, S220 preferably includes controlling the relay node to generate a beam-like mode with a larger beam waist.

In this example, S220 preferably includes determining one or more desired characteristics of the Gaussian beam, such as the focal point location (e.g., distance from the relay node along a line connecting the relay node to the downstream node), the beam waist, the Rayleigh length (or analogously, the confocal parameter/depth of focus), the beam divergence, and/or any other suitable beam characteristics. These characteristics can optionally be determined using a constrained optimization approach. For example, the characteristics can be determined such that the beam waist is maximized, subject to the constraint that the product of the two area coverage fractions is greater than a target link efficiency. In a specific example, in which an aperture i is approximately circular and oriented approximately normal to the beam, the associated area coverage fraction $\epsilon_i$ can related to the beam radius at the aperture $w(z_i)$ based on the approximation $$w(z_i) \approx \frac{\sqrt{2}\, r_i}{\sqrt{-\log(1-\epsilon_i)}},$$

where $r_i$ is the radius of aperture i.

Note that this constraint typically corresponds to a maximum separation between the two nodes, wherein no Gaussian beam approximation can meet or exceed the target link efficiency for nodes separated by a greater distance than this maximum. Accordingly, for a link between nodes separated by more than this maximum, the constraint may need to be relaxed (e.g., by allowing the beam radius at the downstream node to exceed that node's aperture size by a greater amount than typically tolerable) and/or the target link efficiency may need to be revised downward.

A person of skill in the art will recognize that this determination of Gaussian beam characteristics can additionally or alternatively be applied in an analogous manner in performance of S210 (e.g., wherein the transmit node generates the beam-like mode having characteristics determined based on an analogous constrained optimization).

Additionally or alternatively, S220 can include controlling one or more relay nodes to generate one or more other beam-like modes (e.g., Bessel beams, Bessel-Gaussian beams, multi-beam modes, etc.). In examples, characteristics of other beam-like modes can be determined in a manner analogous to the Gaussian beam example described above. Further, S220 can include controlling one or more relay nodes to generate any other suitable RF modes, and/or controlling one or more relay nodes in any other suitable manner.

3.3 Receiving Power.

Receiving power S230 preferably functions to receive the power relayed through the network of nodes. S230 is preferably performed at one or more receive nodes, but can additionally or alternatively be performed at any other suitable elements. In some embodiments, the method can include using the power received in S230 to provide power for one or more electrical devices (e.g., electrical devices electrically coupled to the receive node). For example, the power received can be converted to DC and used to charge an energy store (e.g., battery) connected to the receive node, power a client device connected to the receive node, and/or be used in any other suitable manner. However, S230 can additionally or alternatively include receiving power in any other suitable manner.

3.4 Optimizing Power Network Operation.

Optimizing power network operation S240 can function to improve performance (e.g., efficiency, speed, etc.) of the wireless power network. For example, S240 can include determining and/or modifying operational parameters associated with performance of other elements of the method (e.g., S210, S220, and/or S230).

In some examples, S240 can include optimizing operation of the transmit and/or relay nodes, based on power reception metrics (e.g., sampled by the receive nodes that receive the power). For example, S240 can include performing one or more optimum searches over a parameter space defined by the tunable elements of one or more transmit and/or relay nodes (e.g., phased array elements, tunable metasurface elements, etc.), using one or more objective functions defined based on power received by one or more downstream nodes (e.g., receive nodes). In some examples, the communication modules (e.g., wireless communication modules) of the nodes can be used to communicate power reception metrics, optimum search information, and/or any other suitable information used to perform the optimum search.

For example, S240 can include performing one or more optimum searches (e.g., local searches, global searches such as stochastic global searches, etc.) over one or more parameter spaces (e.g., parameter spaces associated with the transmit node(s), such as associated with phased array parameters, associated with the relay node(s), such as associated with metasurface tuning parameters, etc.), such as by controlling the node(s) based on a parameter value set within the parameter space while transmitting RF power, quantifying the efficiency of RF power transmission to one or more destinations (e.g., receive nodes, relay nodes, etc.), and adjusting the parameter value sets based on these quantifications.

In some such examples, S240 can include optimizing (concurrently, sequentially, and/or with any other suitable relative timing) each node-node link (or a subset thereof) and/or multi-hop segment of the transmission path. In a first such example, S240 can include first optimizing transmit parameters of the transmit node to maximize power incident upon the (first) relay node (e.g., upon the metasurface thereof), then optimizing modulation parameters of that relay node to maximize power incident upon the following node (e.g., downstream relay node, receive node, etc.), and so on. In a variation of this example (e.g., in which the relay node is not operable to quantify and/or communicate power incident upon its metasurface), S240 can include first optimizing transmit parameters of the transmit node to maximize power received at the receive node (e.g., while keeping relay node parameters fixed, while altering relay node parameters only enough to achieve some amount of power transmission to the receive node, etc.), then optimizing modulation parameters of the (first) relay node to maximize power incident upon the receive node, and so on. Additionally or alternatively (e.g., in examples in which the relay node is not operable to quantify and/or communicate power incident upon its metasurface), S240 can include jointly optimizing parameters of multiple nodes (e.g., of the transmit node and the one or more relay nodes defining a transmission path), such as to maximize power received at the receive node(s). However, S240 can additionally or alternatively include performing any other suitable optimizations, based on any suitable information, with any suitable timing.

In some examples, S240 can include determining and/or operating based on one or more charging plans, such as plans that define duty cycles for power delivery to different receive nodes of the system. For example, S240 can include determining charging plan that defines two or more power transmission paths (e.g., a first power transmission path for transmitting power to a first set of receive nodes, a second power transmission path for transmitting power to a second set of receive nodes, etc.) and a duty cycle for each power transmission path (e.g., wherein the method would include transmitting, relaying, and receiving power based on the charging plan, wherein the first power transmission path is utilized for its associated duty cycle, the second power transmission path is utilized for its associated duty cycle, and so on).

In some examples, S240 can include performing one or more elements such as described in U.S. patent application Ser. No. 17/006,242, filed 28 Aug. 2020 and titled "METHOD AND SYSTEM FOR WIRELESS POWER DELIVERY", which is herein incorporated in its entirety by this reference.

However, S240 can additionally or alternatively include optimizing power network operation in any other suitable manner.

Further, the method 20 can additionally or alternatively include any other suitable elements performed in any suitable manner.

The FIGURES illustrate the architecture, functionality and operation of possible implementations of systems, methods and computer program products according to preferred embodiments, example configurations, and variations thereof. In this regard, each block in the flowchart or block diagrams may represent a module, segment, step, or portion of code, which comprises one or more executable instructions for implementing the specified logical function(s). It should also be noted that, in some alternative implementations, the functions noted in the block can occur out of the order noted in the FIGURES. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As a person skilled in the art will recognize from the previous detailed description and from the figures and claims, modifications and changes can be made to the preferred embodiments of the invention without departing from the scope of this invention defined in the following claims.

We claim:

1. A system for wireless power networking, the system comprising:
 a receive node configured to receive power via reception of propagating radio frequency (RF) radiation;
 a relay node comprising a tunable metasurface and a controller, the tunable metasurface operable to modulate propagating RF radiation incident upon the tunable metasurface, wherein:
 the tunable metasurface comprises a plurality of impedance sheets;
 each impedance sheet of the plurality comprises:
  a plurality of electromagnetic resonator networks; and
  a plurality of variable electromagnetic components, wherein each variable electromagnetic component of the plurality is electromagnetically coupled to a different electromagnetic resonator network of the plurality and is operable in a plurality of operation modes such that at least one resonance property of the electromagnetic resonator network is altered by transition of the variable electromagnetic component between the operation modes; and
 the controller is configured to control each variable electromagnetic component of the plurality to transition between the operation modes of the plurality; and
 a transmit node configured to transfer power to the receive node via transmission of propagating RF radiation toward the relay node.

2. The system of claim 1, wherein the transmit node comprises a phased array configured to control the transmission of propagating RF radiation.

3. The system of claim 1, wherein the metasurface is a bianisotropic Huygens metasurface.

4. The system of claim 1, wherein the plurality of impedance sheets comprises a first impedance sheet, wherein the plurality of electromagnetic resonator networks of the first impedance sheet defines a substantially regular array on the metasurface.

5. The system of claim 4, wherein each electromagnetic resonator network of the substantially regular array is substantially identical.

6. The system of claim 1, wherein the plurality of impedance sheets comprises a first impedance sheet, wherein each electromagnetic resonator network of the first impedance sheet defines a parallel LC network comprising an inductive element and a capacitive element.

7. The system of claim 6, wherein the plurality of variable electromagnetic components comprises a set of tunable capacitors, wherein each electromagnetic resonator network of the first impedance sheet is electromagnetically coupled to a different tunable capacitor of the set.

8. The system of claim 7, wherein each electromagnetic resonator network of the first impedance sheet is electromagnetically coupled to the associated tunable capacitor via the inductive element of the electromagnetic resonator network.

9. The system of claim 8, wherein, for each electromagnetic resonator network of the first impedance sheet, the inductive element comprises a conductive strip electrically connected to the associated tunable capacitor.

10. The system of claim 1, wherein each variable electromagnetic component of the plurality comprises a tunable capacitor.

11. The system of claim 10, wherein the controller is configured to independently control the capacitance of each variable electromagnetic component of the plurality.

12. The system of claim 1, wherein each variable electromagnetic component of the plurality comprises a switch operable to electrically connect a respective reactive element to the electromagnetic resonator network electromagnetically coupled to the variable electromagnetic component.

13. The system of claim 1, wherein the plurality of impedance sheets comprises three impedance sheets.

14. The system of claim 1, further comprising a second relay node, the second relay node comprising a second metasurface, wherein:
 the controller is configured to control the tunable metasurface such that propagating RF radiation incident upon the tunable metasurface is redirected toward the second metasurface; and
 the second relay node is configured such that propagating RF radiation incident upon the second metasurface is redirected toward the receive node.

15. The system of claim 1, wherein the relay node further comprises a feeding structure electromagnetically coupled to the tunable metasurface.

16. A method for wireless power networking, the method comprising:
 at a transmit node, transmitting propagating radio frequency (RF) radiation toward a metasurface of a relay node such that a first portion of the propagating RF radiation is incident upon the metasurface;
 controlling the metasurface to modulate the first portion of propagating RF radiation such that:
  the first portion is redirected from the metasurface toward a target location; and
  after the first portion is redirected from the metasurface toward the target location, the first portion is incident upon a receive node;

at the receive node, receiving the first portion of propagating RF radiation; and before the first portion is redirected from the metasurface toward the target location, while transmitting propagating RF radiation from the transmit node toward the metasurface, performing a modulation parameter optimum search, based on a power reception metric associated with power reception at the receive node, over a modulation parameter space associated with the metasurface, wherein performing the modulation parameter optimum search comprises, for each parameter value set of a series of parameter value sets within the modulation parameter space:

controlling the metasurface based on the parameter value set;

determining a value, associated with the parameter value set, of the power reception metric;

based on the parameter value set and the value, determining a subsequent parameter value set; and in response to determining the subsequent parameter value set, if a search convergence criterion has not been met, adding the subsequent parameter value set to the series.

17. The method of claim 16, wherein the receive node comprises the target location.

18. The method of claim 16, wherein:

transmitting propagating RF radiation toward the metasurface comprises transmitting a first Gaussian beam toward the metasurface; and modulating the first portion of propagating RF radiation comprises modulating the first Gaussian beam into a second Gaussian beam directed toward the target location.

19. The method of claim 16, wherein:

the transmit node comprises a phased array;

the modulation parameter space is further associated with the phased array; and performing the modulation parameter optimum search further comprises, for each parameter value set of the series, substantially concurrent with controlling the metasurface based on the parameter value set, controlling the phased array based on the parameter value set.

\* \* \* \* \*